US012587641B2

(12) United States Patent　　　　　(10) Patent No.:　US 12,587,641 B2
Zhao et al.　　　　　　　　　　　　　(45) Date of Patent:　Mar. 24, 2026

(54) SELF-GUIDED INTRA INTERPOLATION FILTER

(71) Applicant: Tencent America LLC, Palo Alto, CA (US)

(72) Inventors: Xin Zhao, San Jose, CA (US); Liang Zhao, Sunnyvale, CA (US); Jing Ye, San Jose, CA (US); Han Gao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 207 days.

(21) Appl. No.: 18/384,759

(22) Filed: Oct. 27, 2023

(65) Prior Publication Data

US 2024/0275959 A1　　Aug. 15, 2024

Related U.S. Application Data

(60) Provisional application No. 63/444,877, filed on Feb. 10, 2023.

(51) Int. Cl.
| | |
|---|---|
| *H04N 7/12* | (2006.01) |
| *H04N 19/11* | (2014.01) |
| *H04N 19/117* | (2014.01) |
| *H04N 19/136* | (2014.01) |
| *H04N 19/159* | (2014.01) |
| *H04N 19/176* | (2014.01) |
| *H04N 19/593* | (2014.01) |

(52) U.S. Cl.
CPC ........... *H04N 19/117* (2014.11); *H04N 19/11* (2014.11); *H04N 19/136* (2014.11); *H04N 19/159* (2014.11); *H04N 19/176* (2014.11); *H04N 19/593* (2014.11)

(58) Field of Classification Search
CPC ..................................................... H04N 19/11
See application file for complete search history.

(56) References Cited

U.S. PATENT DOCUMENTS

| | | | |
|---|---|---|---|
| 2021/0120241 A1 | 4/2021 | Filippov et al. | |
| 2022/0398455 A1 | 12/2022 | Dumas et al. | |

OTHER PUBLICATIONS

Rivaz et al., AV1 Bitstream & Decoding Process Specification The Alliance for Open Media 681, Jan. 8, 2019, pp. 1-681.
(Continued)

*Primary Examiner* — Y Lee
(74) *Attorney, Agent, or Firm* — ARENTFOX SCHIFF LLP

(57) ABSTRACT

An apparatus includes processing circuitry that receives, from a bitstream including a current block in a picture, coding information of the bitstream. The coding information indicates that the current block is coded in an angular intra prediction mode with an intra interpolation filter. The processing circuitry applies each of a predefined set of intra interpolation filters to neighboring reconstructed samples within N adjacent lines from a boundary of the current block. The processing circuitry selects one intra interpolation filter from the predefined set of intra interpolation filters based a prediction error associated with the each of the predefined set of intra interpolation filters and predicts a sample in the current block using the angular intra prediction mode using the selected one intra interpolation filter. The processing circuitry reconstructs the current block based on the predicted sample.

20 Claims, 12 Drawing Sheets

(56)                 References Cited

OTHER PUBLICATIONS

Chen et al., An Overview of Core Coding Tools in the AV1 Video Codec, 2018 Picture Coding Symposium (PCS), San Francisco, CA, USA, 2018, pp. 41-45.

L. Zhao, X. Zhao, S. Liu, X. Li, J. Lainema, G. Rath, F. Urban, F. Racapé, "Wide Angular Intra Prediction for Versatile Video Coding," 2019 Data Compression Conference (DCC), Snowbird, UT, USA, 2019, pp. 53-62.

Y .- J. Chang, H.-J. Jhu, H.-Y. Jian, L. Zhao, X. Zhao, X. Li, S. Liu, B. Bross, p. Keydel, H. Schwarz, D. Marpe, and T. Wiegand, "Intra prediction using multiple reference lines for the versatile video coding standard," Proc. SPIE 11137, Applications of Digital Image Processing XLII, 1113716, Sep. 2019, pp. 1-8.

Zhao, X. Zhao, and S. Liu, "Improved Intra Coding Beyond AV1 Using Adaptive Prediction Angles and Reference Lines," IEEE International Conference on Image Processing (ICIP), Abu Dhabi, United Arab Emirates, Sep. 2020, pp. 1-5.

Yize Jin, Liang Zhao, Xin Zhao, Shan Liu, Alan. C. Bovik, "Improved Intra Mode Coding Beyond Av1", Acoustics Speech and Signal Processing (ICASSP) ICASSP 2021—2021 IEEE International Conference on, pp. 1580-1584, 2021, pp. 1-5.

International Search Report and Written Opinion issued Feb. 23, 2024 in Application No. PCT/US2023/078216, pp. 1-8.

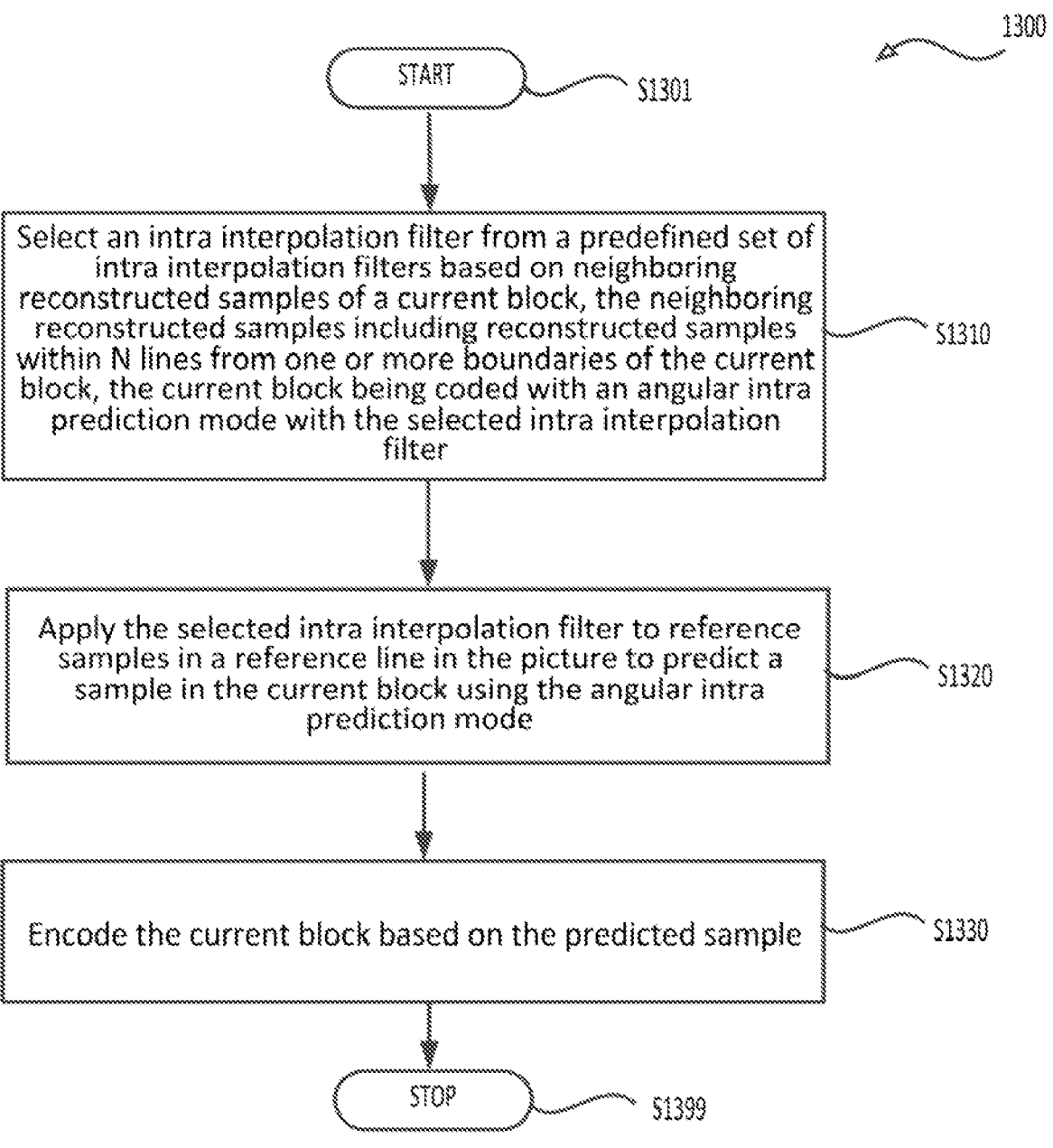

1300

START — S1301

Select an intra interpolation filter from a predefined set of intra interpolation filters based on neighboring reconstructed samples of a current block, the neighboring reconstructed samples including reconstructed samples within N lines from one or more boundaries of the current block, the current block being coded with an angular intra prediction mode with the selected intra interpolation filter — S1310

Apply the selected intra interpolation filter to reference samples in a reference line in the picture to predict a sample in the current block using the angular intra prediction mode — S1320

Encode the current block based on the predicted sample — S1330

STOP — S1399

FIG. 13

SELF-GUIDED INTRA INTERPOLATION FILTER

INCORPORATION BY REFERENCE

The present application claims the benefit of priority to U.S. Provisional Application No. 63/444,877, "Self-guided Intra interpolation filter" filed on Feb. 10, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. In an example, the processing circuitry receives, from a bitstream comprising a current block in a picture, coding information of the bitstream indicating that the current block is coded in an angular intra prediction mode with an intra interpolation filter. The processing circuitry applies each of a predefined set of intra interpolation filters to neighboring reconstructed samples within N adjacent lines from a boundary of the current block. N is a positive integer. The processing circuitry selects one intra interpolation filter from the predefined set of intra interpolation filters based a prediction error associated with the each of the predefined set of intra interpolation filters and predicts a sample in the current block using the angular intra prediction mode using the selected one intra interpolation filter.

In an example, the processing circuitry receives a bitstream of a current block in a picture. Coding information of the bitstream indicates that the current block is coded with an angular intra prediction mode with an intra interpolation filter. The processing circuitry selects the intra interpolation filter from a predefined set of intra interpolation filters based on neighboring reconstructed samples of the current block. The neighboring reconstructed samples include reconstructed samples within N lines from one or more boundaries of the current block. The processing circuitry applies the selected intra interpolation filter to reference samples in a reference line in the picture to predict a sample in the current block using the angular intra prediction mode and reconstructs the current block based on the predicted sample.

In an example, the processing circuitry selects one of (i) a type of the intra interpolation filter or (ii) a number of taps in the intra interpolation filter from the predefined set of intra interpolation filters based on the neighboring reconstructed samples of the current block.

In an example, the predefined set of intra interpolation filters includes different types of intra interpolation filters. The processing circuitry selects the type of the intra interpolation filter from the different types of intra interpolation filters based on the neighboring reconstructed samples of the current block. The selected intra interpolation filter is one of a bilinear interpolation filter, a cubic interpolation filter, a spline interpolation filter, a DCT based interpolation filter, or a DST based interpolation filter.

In an example, the predefined set of intra interpolation filters includes different numbers of taps. The processing circuitry selects the number of taps of the intra interpolation filter based on the neighboring reconstructed samples of the current block. The number of taps of the intra interpolation filter is one of 2-tap, 4-tap, 6-tap, or 8-tap.

In an example, N is larger than 1 and the neighboring reconstructed samples include multiple lines of neighboring reconstructed samples. For each combination of an intra interpolation filter in the predefined set of intra interpolation filters and a line of neighboring samples in the multiple lines of neighboring reconstructed samples, the processing circuitry predicts the respective line of neighboring reconstructed samples and obtaining at least one prediction error based on one or more remaining lines in the multiple lines of neighboring reconstructed samples using the respective intra interpolation filter and selects the intra interpolation filter that corresponds to the minimal prediction error among the obtained prediction errors.

In an example, whether the neighboring reconstructed samples include (i) left lines of neighboring reconstructed samples to the left of the current block, (ii) top lines of neighboring reconstructed samples above the current block, or (iii) the left lines of neighboring reconstructed samples to the left of the current block and the top lines of neighboring reconstructed samples above the current block depends on an intra prediction direction of the angular intra prediction mode.

In an example, a value of N depends on a block size.

In an example, the processing circuitry predicts each line of neighboring reconstructed samples based on an intra prediction direction of the angular intra prediction mode.

In an example, the processing circuitry predicts each line of neighboring reconstructed samples based on an opposite direction to an intra prediction direction of the angular intra prediction mode.

In an example, the processing circuitry selects the intra interpolation filter from the predefined set of intra interpolation filters and selects the angular intra prediction mode from angular intra prediction modes based on the neighboring reconstructed samples of the current block.

In an example, the processing circuitry derives N1 angular intra prediction modes in the angular intra prediction modes associated with N1 lowest cost values in cost values of the respective angular intra prediction modes. Each cost value is determined based on the neighboring reconstructed samples of the current block, the respective angular intra prediction mode, and a default intra interpolation filter in the predefined set of intra interpolation filters. For each of the N1 angular intra prediction modes, the processing circuitry selects M1 intra interpolation filters from the predefined set of intra interpolation filters associated with M1 lowest cost values in cost values of the predefined set of intra interpolation filters. Each cost value is determined based on the neighboring reconstructed samples of the current block, the respective intra interpolation filter, and the respective angular intra prediction mode in the N1 angular intra prediction modes. The processing circuitry selects the intra interpolation filter and the angular intra prediction mode from N1×M1 combinations. Each combination in the N1×M1 combinations includes an intra interpolation filter in the M1 intra interpolation filters and an angular intra prediction mode in the N1 angular intra prediction modes.

In an example, the processing circuitry selects N2 angular intra prediction modes from a first plurality of modes in the angular intra prediction modes based on the neighboring reconstructed samples of the current block and an intra interpolation filter. The processing circuitry selects a first updated intra interpolation filter based on the neighboring reconstructed samples of the current block and one of the N2 angular intra prediction modes. The processing circuitry selects N3 angular intra prediction modes from a second plurality of modes in the angular intra prediction modes based on the neighboring reconstructed samples of the current block and the first updated intra interpolation filter. The processing circuitry selects a second updated intra interpolation filter based on the neighboring reconstructed samples of the current block and one of the N3 angular intra prediction modes. The processing circuitry selects the second updated intra interpolation filter as the selected intra interpolation filter and selecting the one of the N3 angular intra prediction modes as the selected angular intra prediction mode based on (i) a difference between a first prediction error associated with the first updated intra interpolation filter and the one of the N2 directional intra prediction modes and a second prediction error associated with the second updated intra interpolation filter and the one of the N3 angular intra prediction modes or (ii) the second prediction error.

In an example, for each combination of an angular intra prediction mode in the angular intra prediction modes and an intra interpolation filter from the predefined set of intra interpolation filters, the processing circuitry determines a cost value for the respective combination based on the neighboring reconstructed samples of the current block, selects K combinations based on the determined cost values, and selects the intra interpolation filter and the angular intra prediction mode from the K combinations based on index information signaled in the bitstream.

In an example, the processing circuitry calculates a feature value based on the neighboring reconstructed samples of the current block and selects the intra interpolation filter based on the calculated feature value.

In an example, the processing circuitry calculates the feature value as one of (i) an absolute gradient value associated with the neighboring reconstructed samples of the current block or (ii) a difference between a minimal value of the neighboring reconstructed samples of the current block and a maximal value of the neighboring reconstructed samples of the current block.

In an example, the processing circuitry obtains an output from a neural network, an input of the neural network including the neighboring reconstructed samples of the current block, the output indicating the selected intra interpolation filter. The input of the neural network further includes an intra prediction mode index indicating the angular intra prediction mode.

Aspects of the disclosure also provide a non-transitory computer-readable medium storing instructions which when executed by a computer cause the computer to perform the method for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 13 shows a flow chart outlining an encoding process according to some aspects of the disclosure.

DETAILED DESCRIPTION OF ASPECTS

Figure 1:
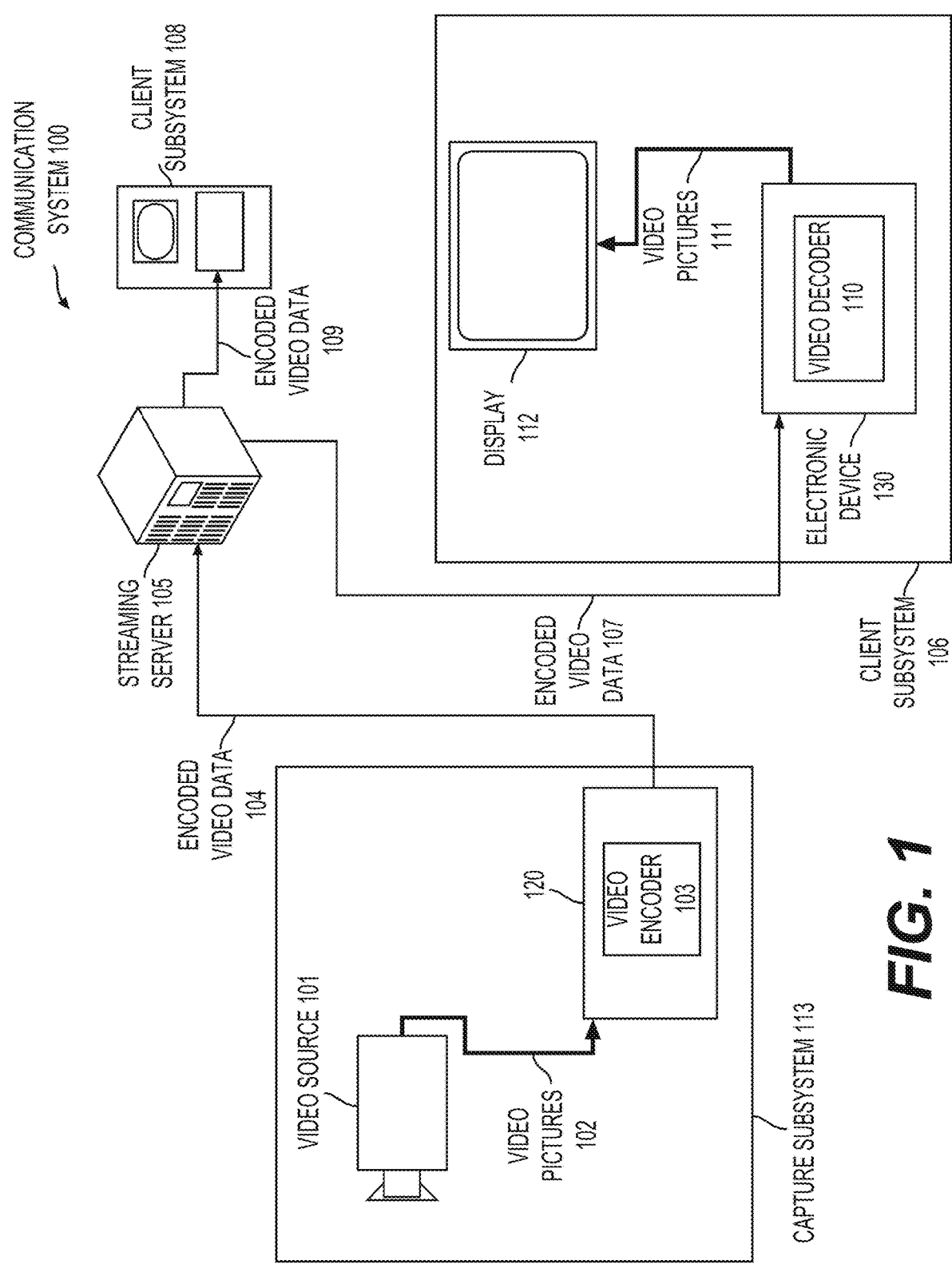
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
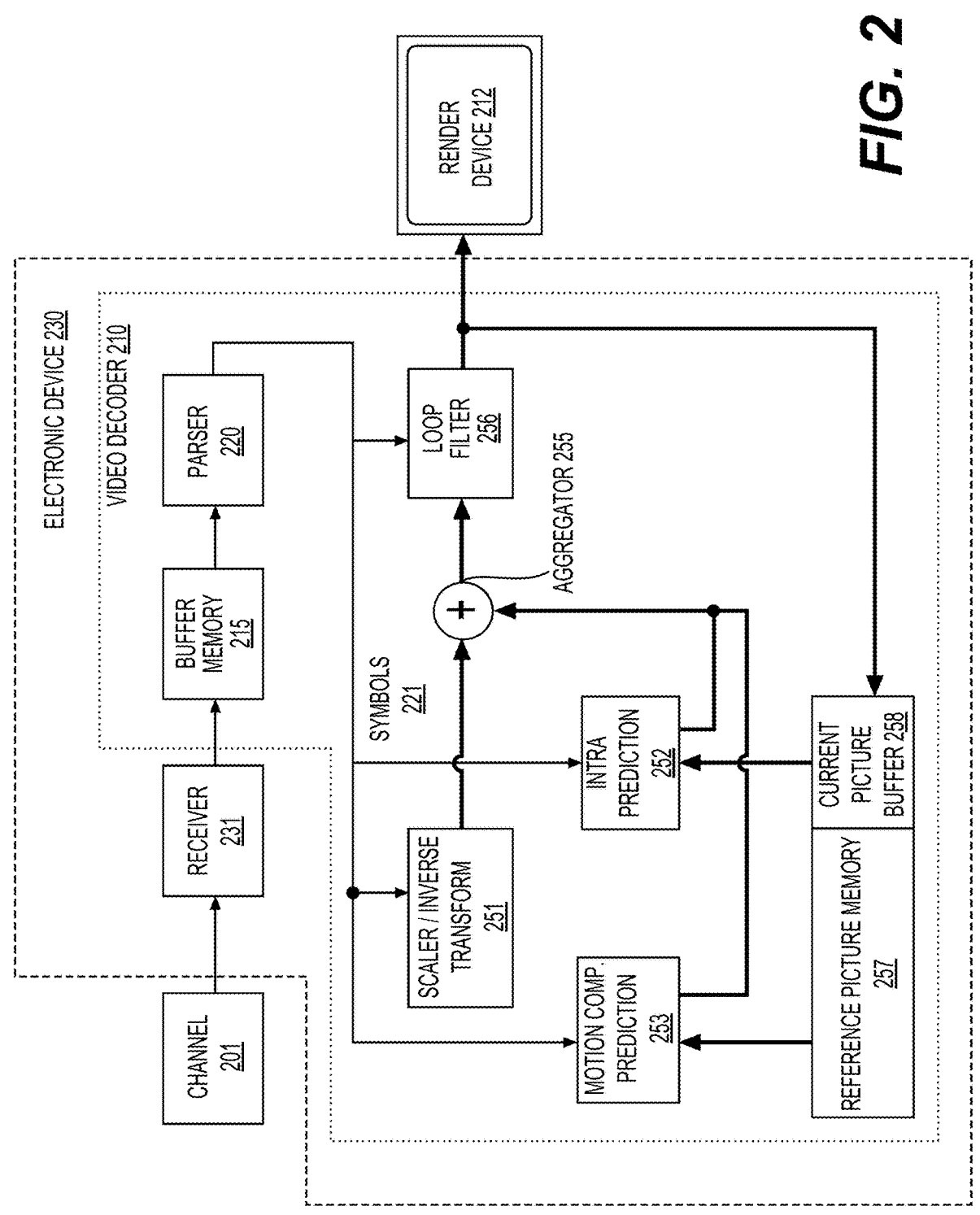
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
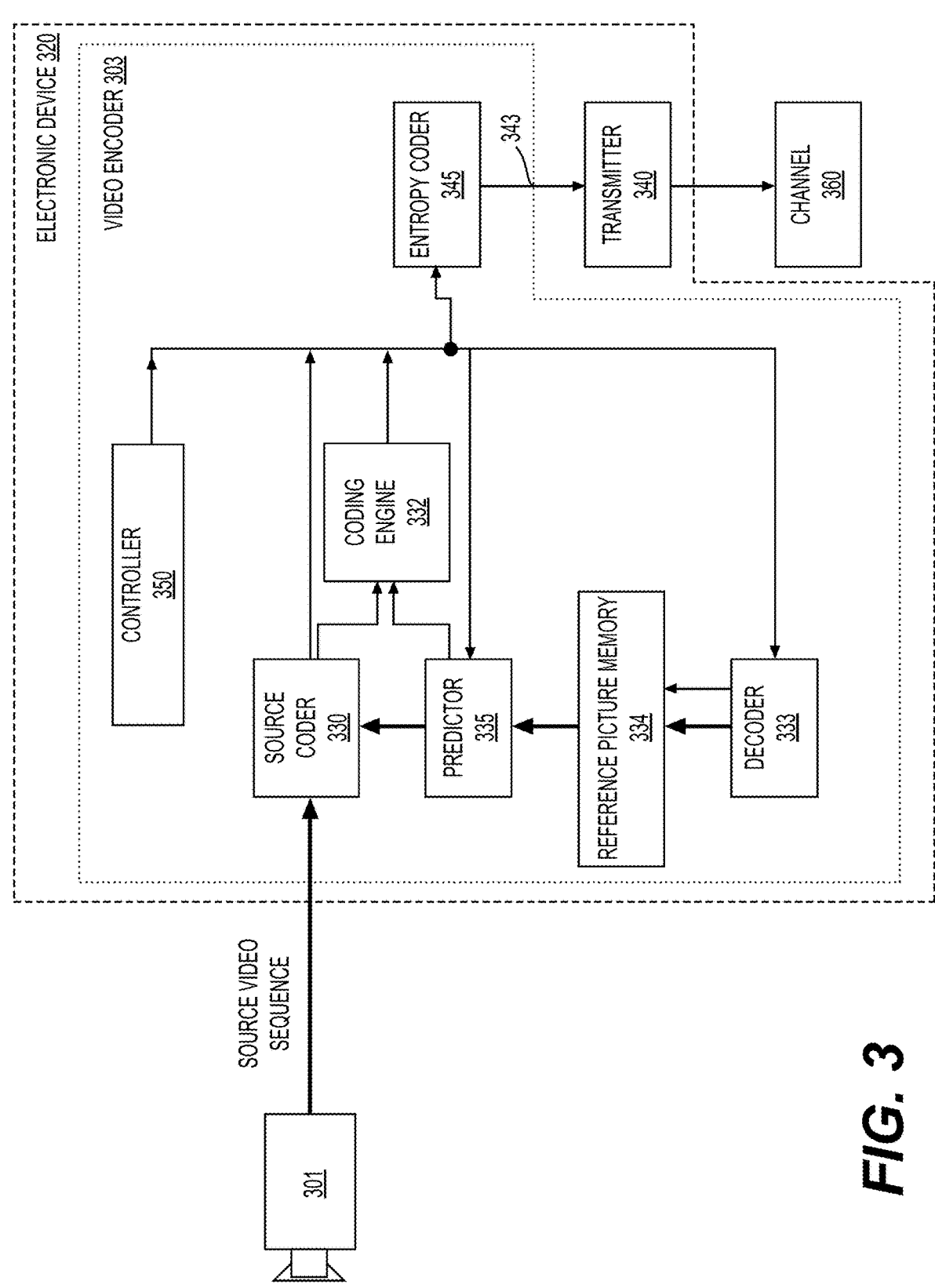
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/ entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs.

In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Video codec technologies can include intra coding. In intra coding, sample values can be represented without reference to samples or other data from previously reconstructed reference pictures. In some video codecs, a picture can be spatially divided into blocks of samples. When all blocks of samples are coded in an intra mode, the picture can be an intra picture (e.g., I picture).

In some aspects, prediction can be performed based on surrounding sample data and/or metadata obtained during the encoding and/or decoding of blocks of data. Such techniques are referred to as "intra prediction" techniques. In an aspect, intra prediction (e.g., intra picture prediction) can use reference data only from a current picture under reconstruction and not from reference pictures.

In intra prediction, a predictor block can be formed using neighboring sample values of already available samples. Sample values of neighboring samples can be copied into the predictor block according to a direction. A reference to the direction in use can be coded in the bitstream or may itself be predicted.

Figure 9:
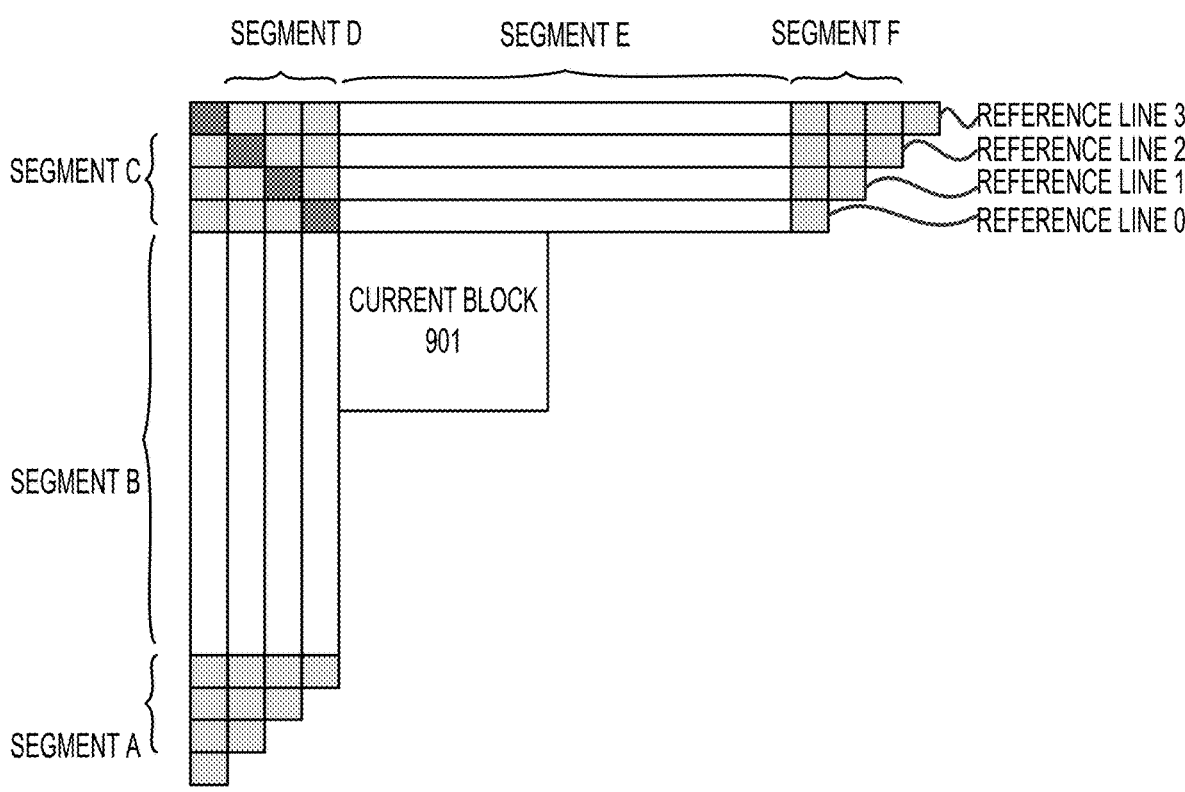
FIG. 9 shows an example of multiple reference line (MRL) intra prediction.

Various intra prediction coding tools can be used such as angular intra prediction, such as shown in FIGS. 4-6 and 10, multiple reference line (MRL) prediction such as shown in FIG. 9, and/or the like. Non-directional intra prediction modes can also be used.

Figure 4:
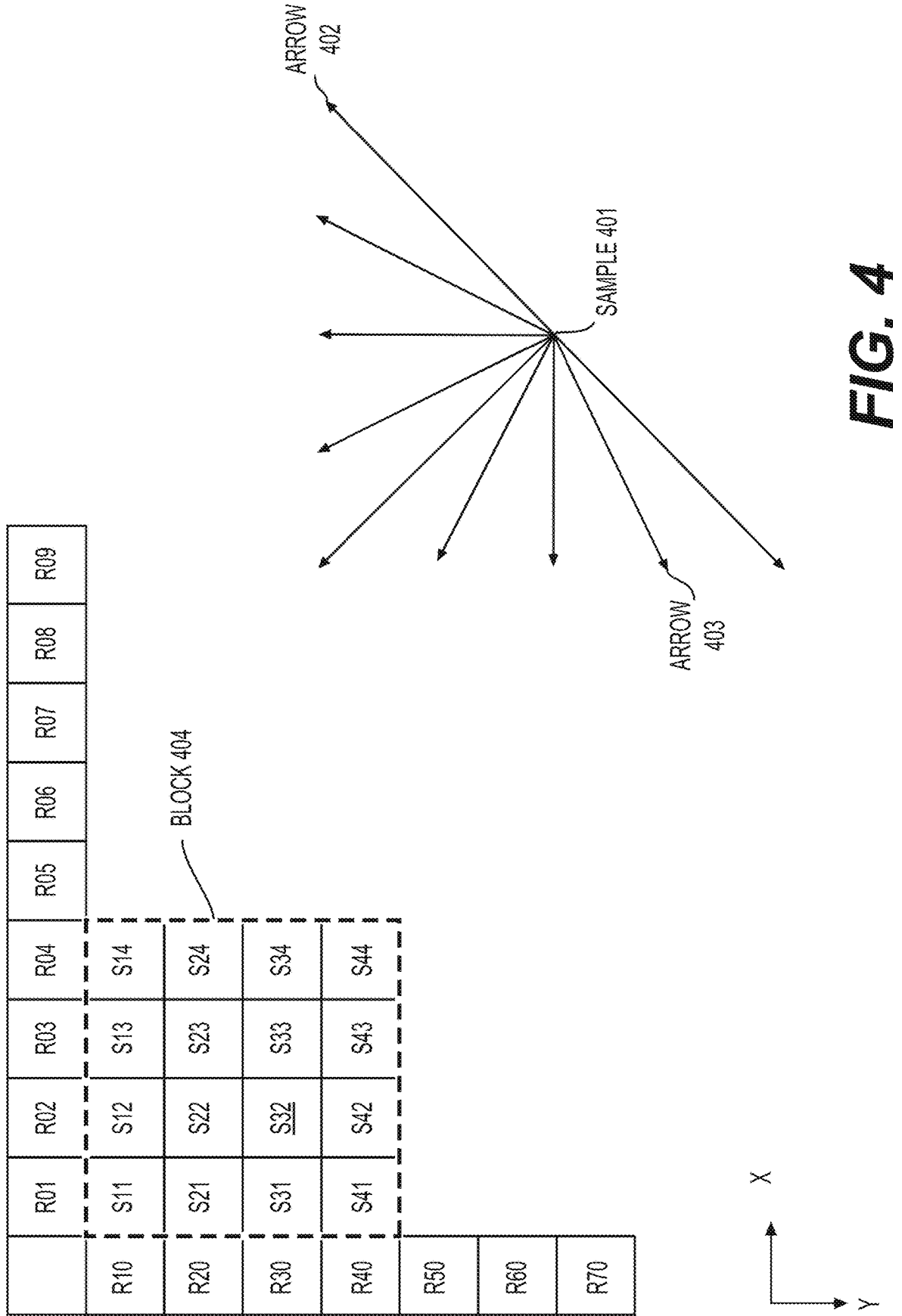
FIG. 4 depicts nine predictor directions from possible predictor directions according to an aspect of the disclosure.

FIG. 4 depicts nine predictor directions from possible predictor directions (e.g., 33 predictor directions corresponding to 33 angular modes of 35 intra modes such as defined in H.265) according to an aspect. A point (401) represents a sample being predicted. Arrows represent directions from which the sample (401) can be predicted. For example, an arrow (402) indicates that the sample (401) is predicted from a sample or samples to the upper right, at a 45° angle from a horizontal direction (e.g., an X dimension). An arrow (403) indicates that the sample (401) is predicted from a sample or samples to the lower left of the sample (401), in a 22.5° angle from the horizontal direction.

FIG. 4 also depicts a block (e.g., a square block of 4×4 samples indicated by a dashed, boldface line) (404). The block (404) can include 16 samples, each labelled with an "S", its position in the Y dimension (e.g., row index) and its position in the X dimension (e.g., column index). For example, a sample S21 is the second sample in the Y dimension (from the top) and the first (from the left) sample in the X dimension. FIG. 4 also shows reference samples in a similar numbering scheme. A reference sample is labelled with an R, its Y position (e.g., row index) and X position (column index) relative to the block (404). In some aspects (e.g., in H.264 and H.265), prediction samples can neighbor the block under reconstruction. In some aspects, multiple reference lines can be used such as shown in FIG. 9.

Intra prediction can work by copying reference sample values from the neighboring samples indicated by a prediction direction (e.g., a signaled prediction direction). For example, if a prediction direction indicated by the arrow (402) is signaled in the coded video bitstream, samples are predicted from samples to the upper right, at a 45° angle from the horizontal. For example, samples S41, S32, S23, and S14 are predicted from the same reference sample R05. A sample S44 can be predicted from a reference sample R08.

Figure 10:
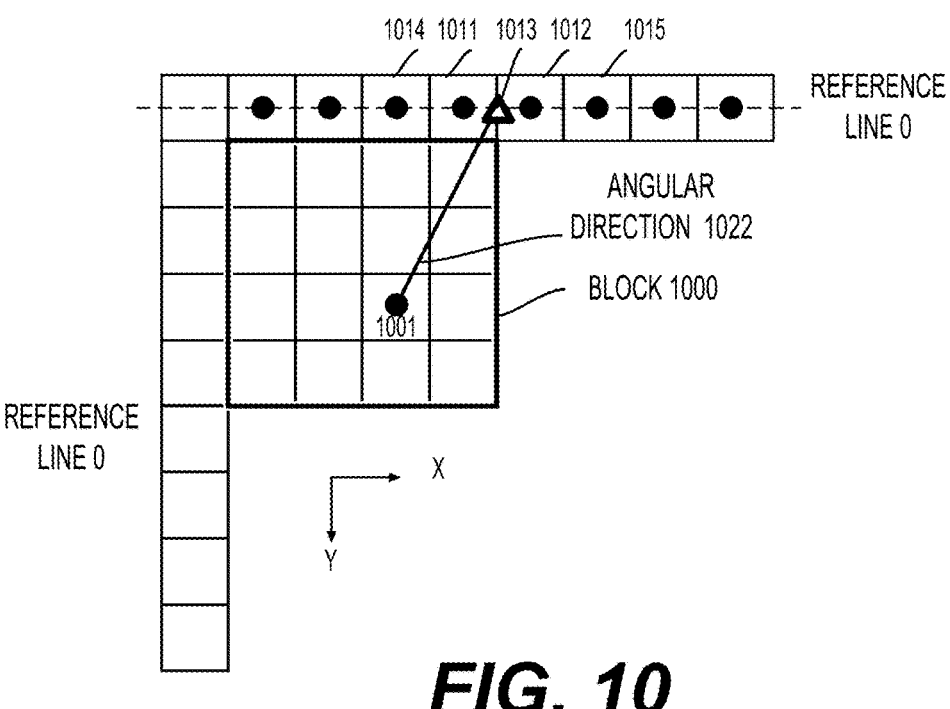
FIG. 10 shows an exemplary angular intra prediction using a reference line 0 that is adjacent to a block.

In certain cases, values of multiple reference samples may be combined, for example, through interpolation (e.g., an intra interpolation filter), in order to calculate a reference sample, such as described in FIG. 10. For example, values of multiple reference samples are combined through interpolation when the directions are not evenly divisible by 45°.

Any suitable number of possible directions can be used in the intra prediction. 9 different directions are used in the example of FIG. 4 (e.g., in H.264). In an example such as in H.265, 33 different directions are used.

Figure 5:
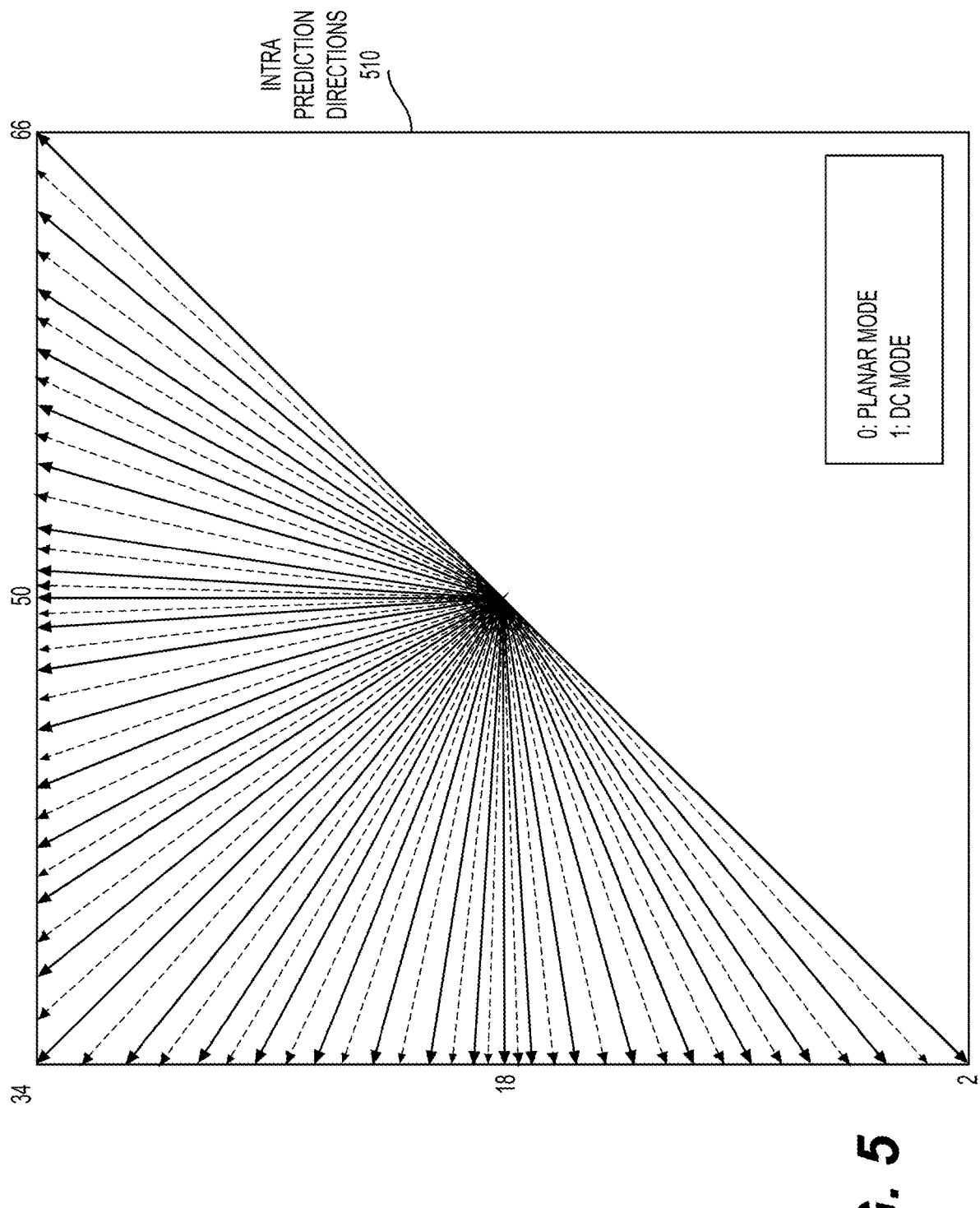
FIG. 5 shows intra prediction directions according to an aspect of the disclosure.

In an example such as in finer-granularity angular prediction in VVC, 65 different directions are used. 65 angular prediction directions can be used for a block size, and the set of angles can depend on the block size. For square blocks, in an example, the 65 angular prediction directions are defined from 45° to −135° in a clockwise direction for a square shape coding block. FIG. 5 shows a schematic (510) that depicts 65 intra prediction directions according to an aspect of the disclosure (e.g., in JEM). In addition to the 65 intra prediction directions (corresponding to 65 intra prediction modes 2-66), the intra prediction modes can include a planar mode ("0") and a DC mode ("1").

Wide-angle intra prediction (WAIP) can be used in some examples such as in VVC. In the WAIP, for blocks that are not square, 14 angles using prediction from the shorter side of a block can be replaced by more extreme angles using prediction from the longer side, bringing the total number of angles supported in the WAIP to 93, and the number of angular modes that can be signaled for a particular block size can remain 65.

Figure 6:
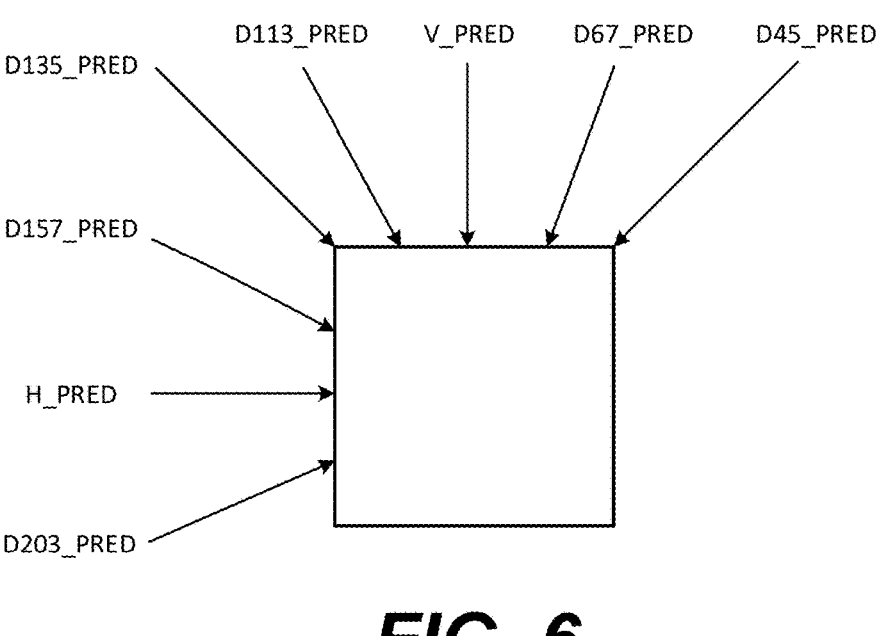
FIG. 6 shows 8 nominal angles: V_PRED, H_PRED, D45_PRED, D135_PRED, D113_PRED, D157_PRED, D203_PRED, and D67_PRED according to an aspect of the disclosure.

In an example, such as in VP9, 8 directional modes corresponding to angles from 45° to 207° are supported. An example of a directional intra prediction, such as used in Alliance for Open Media (AOMedia) Video 1 (AV1), is shown in FIG. 6. To exploit more varieties of spatial redundancy in directional textures, for example, in AV1, directional intra modes can be extended to an angle set with a finer granularity. The original 8 angles can be slightly changed and made as nominal angles. FIG. 6 shows the 8 nominal angles: V_PRED, H_PRED, D45_PRED, D135_PRED, D113_PRED, D157_PRED, D203_PRED, and D67_PRED. Each nominal angle can have 7 finer angles, and thus 56 directional angles are used, for example, in AV1. A prediction angle can be presented by a nominal intra angle (e.g., V_PRED) plus an angle delta, which is −3 to 3 multiplies a step size of 3°. In an aspect, to implement directional prediction modes via a generic way in AV1, the directional intra prediction modes (e.g., all the 56 directional intra prediction modes) in AV1 are implemented with a unified directional predictor that projects each pixel to a reference sub-pixel location and interpolates the reference pixel by an intra interpolation filter (e.g., a 2-tap bilinear filter), such as shown in FIG. 10.

Figures 7, 8:
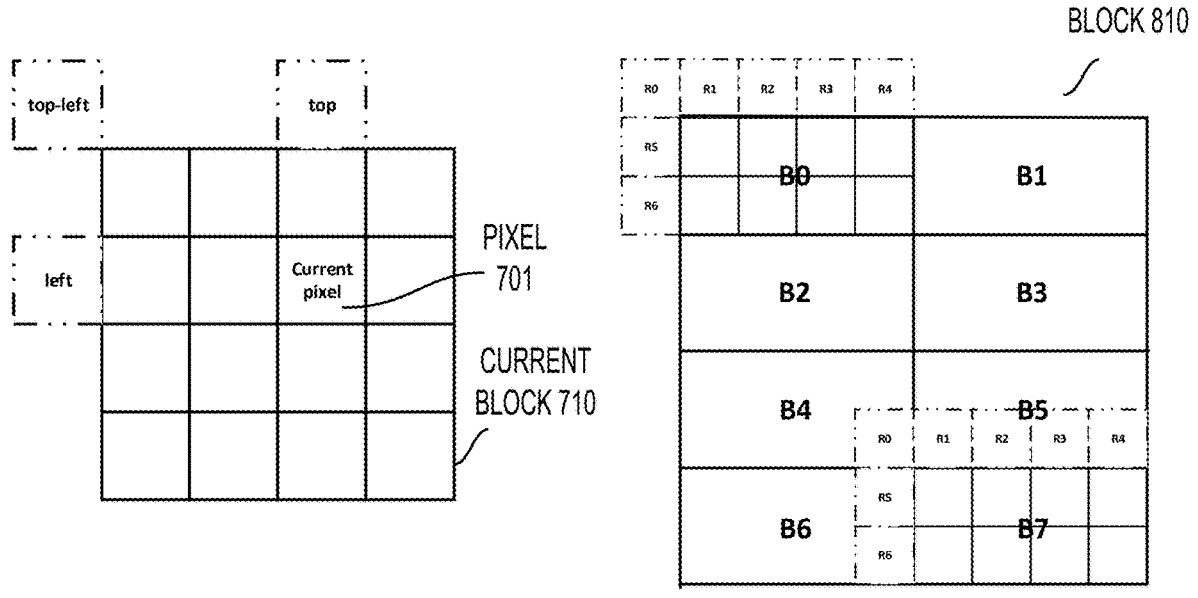
FIG. 7 shows an example of non-directional intra predictors according to an aspect of the disclosure.
FIG. 8 shows examples for recursive intra filtering modes according to aspects of the disclosure.

FIG. 7 shows an example of non-directional intra predictors such as used in AV1 according to an aspect of the disclosure. FIG. 7 shows positions of top, left, and top-left samples for one pixel (701) in a current block (710) to be predicted. In an example, such as in AV1, 5 non-directional smooth intra prediction modes including DC, PAETH, SMOOTH, SMOOTH_V, and SMOOTH_H are used. For the DC prediction, an average of left and above neighboring samples can be used as a predictor of the pixel (701) in the current block (710). For a PAETH predictor, top, left and top-left reference samples can firstly be fetched, and then a value which is closest to (top+left−top−left) can be set as a predictor for the pixel (701). SMOOTH, SMOOTH_V, and SMOOTH_H modes can predict the block (710) using quadratic interpolation in a vertical direction or a horizontal direction, or the average of both directions.

A recursive-filtering-based intra predictor is described using FIG. 8. FIG. 8 shows examples for recursive intra filtering modes according to aspects of the disclosure. To capture decaying spatial correlation with references on the edges, FILTER INTRA modes can be used for blocks (e.g., luma blocks). Five filter intra modes can be used, such as in AV1. Each can be represented by a set of eight 7-tap filters reflecting correlation between pixels in a 4×2 patch and 7 neighbors adjacent to the 4×2 patch. Weighting factors for the 7-tap filter can be position dependent. FIG. 8 shows an example for an 8×8 block (810). The block (810) can be split into eight 4×2 patches B0, B1, B2, B3, B4, B5, B6, and B7. 7 neighbors (e.g., indicated by R0 to R7) of each patch can be used to predict pixels in the current patch. For the patch B0, all the neighbors (e.g., indicated by R0 to R7 of the patch B0) are already reconstructed. For other patches, not all the neighbors may have been reconstructed, then predicted values of immediate neighbors can be used as the reference. For example, neighbors (e.g., all the neighbors) of the patch B7 are not reconstructed, and the prediction samples of neighbors (e.g., the patches B5 and B6) are used.

The MRL intra prediction can use multiple reference lines for intra prediction. FIG. 9 shows an example of the MRL intra prediction. Four reference lines 0-3 of a current block (901) are shown in FIG. 9. The reference line i can include reference samples that are i lines away from the current block (901), for example, i lines away from boundaries (e.g., i rows away from a top boundary and/or i columns away from a left boundary) of the current block (901) where i is 0, 1, 2, or 3. For example, the reference line i includes reference samples that are i rows above the top boundary of the current block (901) and/or i columns to the left of the left boundary of the current block (901). In an example, the reference line 0 includes reference samples that are adjacent to the current block (901), such as reconstructed neighboring samples including top neighboring samples that are above the current block (901) and left neighboring samples that are to the left of the block (901). In an example, the reference line 0 can include a top-left reconstructed neighboring sample.

The reference lines 0-3 can include multiple segments, such as segments A-F. In an example, samples of the segments A and F are not fetched from reconstructed neighboring samples. The samples of the segments A and F can be padded (or filled) with the closest samples from the segments B and E, respectively.

In an example, such as in HEVC, the nearest reference line (i.e., reference line 0) is used in intra prediction (or intra-picture prediction). In an example, a reference line (e.g., reference line 1) other than the nearest reference line is used in intra prediction. In an example, multiple reference lines can be used in the MRL intra prediction.

The MRL intra prediction can be extended, for example, in Enhanced Compression b (ECM5), to include more reference lines for intra prediction.

In the angular intra prediction, a current sample in a current block can be predicted using a reference sample (e.g., a prediction sample) or an interpolated reference sample, for example, in a reference line.

FIG. 10 shows an example of the angular intra prediction using the reference line 0 that is adjacent to a block (1000). The description can be suitably applied to using a reference line (e.g., the reference line 1) that is non-adjacent to the block (1000). A portion of the reference lines 0 is shown. A sample (1001) in the block (1000) can be predicted using one or more samples of the reference line 0 with an intra predictor direction (or an angular direction) (1022). The sample (1001) can be projected to the reference line 0 along the angular direction (1022).

In the example shown in FIG. 10, a projected position (1013) of the sample (1001) is located between two reference samples (1011)-(1012) of the reference line 0, and is referred to as a projected fractional position or a fractional sample position. Reference samples around the projected position (1013) can be used to predict the sample (1001), for example, by using an interpolation filter (e.g., an intra interpolation filter). In an aspect, the interpolation filter is applied when the projected position (1013) of the sample (1001) is a fractional sample position between two adjacent reference samples. The intra interpolation filter can be any suitable filter, such as a bilinear filter, a cubic filter, a spline interpolation filter, a DCT-based interpolation filter, a DST-based interpolation filter, or the like. In an aspect, a sample (e.g., the sample (1001)) that is to be intra predicted using an angular intra prediction mode is projected to a fractional position (e.g., the projected position (1013)) located between two adjacent reference samples (e.g., (1011)-(1012)), and a filter that is used to generate a prediction sample value for the sample is referred to as an intra interpolation filter. In an example, the prediction sample value is based on interpolation of sample values of the two adjacent reference samples (e.g., (1011)-(1012)), for example, the prediction sample value is a weighted average of the sample values of the two adjacent reference samples with weights corresponding to filter coefficients of the intra prediction filter. In an example, the weights are the respective filter coefficients of the intra prediction filter. In an example, the prediction sample value is based on interpolation of sample values of the two adjacent reference samples (e.g., (1011)-(1012)) and additional reference samples.

The two reference samples (1011)-(1012) of the reference line 0 can be used to predict the sample (1001) using a two-tap intra interpolation filter (e.g., a bilinear filter). In an example, filter coefficients in the 2-tap intra interpolation filter can be based on two distances between the projected position (1013) and the two adjacent integer positions (indicated by black dots) of the two reference samples (1011)-(1012), respectively. For example, a filter coefficient for the reference sample (1011) is larger than a filter coefficient for the reference sample (1012) if the distance between the projected fractional position (1013) and the reference sample (1011) is less than the distance between the projected fractional position (1013) and the reference sample (1012).

In an example, the 4 reference samples (1011), (1012), (1014), and (1015) of the reference line 0 can be used to predict the sample (1001) using a 4-tap intra interpolation filter (e.g., a 4-tap linear interpolation filter), such as a DCT-based interpolation filter (DCTIF).

Intra interpolation filters can vary by filter types, a number of filter coefficients (also referred to as filter taps or taps), and/or the like. Filter types can include different types of intra interpolation filters, such as a bilinear filter, a cubic filter, a spline filter, a DCT-based interpolation filter, a DST-based interpolation filter, and the like. In an example, the filter types include intra interpolation filters associated with different directions, such as a horizontal filter (e.g., applied to samples in a row, such as shown in FIG. 10) and a vertical filter (e.g., applied to samples in a column). Referring to FIG. 10, the 2-tap intra interpolation filter applied to the two reference samples (1011)-(1012) can be a horizontal filter.

Intra interpolation filters can vary by a number of filter taps, for example, different intra interpolation filters can include intra interpolation filters having different taps, such as 2-tap, 4-tap, 6-tap and 8-tap filters.

Intra interpolation filters can vary by filter types and filter taps.

In related technologies, the known intra interpolation filter is a fixed interpolation filter for a block (e.g., each block). In an example, an intra interpolation filter applied to a block is considered as being fixed when a filter type and a number of taps of the intra interpolation filter are fixed. When the filter type and the number of taps of the intra interpolation filter are fixed, filter coefficients of the intra interpolation filter can vary based on samples to be predicted in the block and respective intra prediction modes used to predict the samples.

An optimal intra interpolation filter can depend on the statistics of samples in an image or in a video, such as in a picture or in a frame, and thus using a fixed interpolation filter (e.g., a fixed intra interpolation filter) may be suboptimal.

A current block in a current picture can be coded with intra prediction using a directional intra prediction mode. A directional intra prediction mode can also be referred to as an angular intra prediction mode, an angular mode, a directional mode, or a directional intra mode. A directional intra prediction mode or an angular intra prediction mode is an intra prediction mode that can predict samples in the current block along a prediction direction associated with the angular intra prediction mode, such as described in FIGS. 4 and 10.

According to an aspect of the disclosure, an intra interpolation filter (e.g., such as described in FIG. 10) used in the angular intra prediction mode can be determined (e.g., derived or selected) based on neighboring reconstructed samples (also referred to as neighboring reconstruction samples) of the current block. The determination of the intra interpolation filter can include determining one or more characteristics of the intra interpolation filter. For example, the determination of the intra interpolation filter includes determining a type of the intra interpolation filter and/or determining a number of taps used in the intra interpolation filter. The determined intra interpolation filter can depend on the neighboring reconstructed samples of the current block, and thus can be considered as self-guided, for example, the determination of the intra interpolation filter is guided by the neighboring reconstructed samples of the current block. The determined intra interpolation filter can be referred to as a self-guided intra interpolation filter and can be applied to predicting samples in the current block.

In an aspect, the intra interpolation filter is determined for the current block based on the neighboring reconstructed samples of the current block and the angular intra prediction mode used to predict the current block. In an example, a first portion (e.g., a reference line 0 in FIG. 11) of the neighboring reconstructed samples is predicted using the angular intra prediction mode from a second portion (e.g., a reference line 1 in FIG. 11) of the neighboring reconstructed samples using a predefined set of intra interpolation filters, and thus predicted first portions associated with the predefined set of intra interpolation filters are generated. One of the predefined set of intra interpolation filters can be selected based on a comparison of the predicted first portions and the first portion. For example, prediction errors are generated based on the predicted first portions and the first portion, and the one of the predefined set of intra interpolation filters can be selected as the intra interpolation filter associated with the minimum prediction error. In an example, the predefined set of intra interpolation filters includes a first filter and a second filter. The predicted first portions include the predicted first portion I predicted using the first filter, and the predicted first portion II predicted using the second filter. The prediction errors include a first prediction error between the predicted first portion I and the first portion and a second prediction error between the predicted first portion II and the second portion. The first filter can be selected as the intra prediction filter for the current block if the first prediction error is the minimum prediction error (e.g., the first prediction error is less the second prediction error). The above description can be suitably adapted if multiple portions (e.g., reference lines 0-3) (instead of only the first portion described above) are used to determine the intra prediction filter.

In an aspect, the intra interpolation filter and the angular intra prediction mode used to predict the current block are determined for the current block based on the neighboring reconstructed samples of the current block.

Using the self-guided intra interpolation filter can improve coding efficiency, and thus can be more efficient than using a fixed interpolation filter in related technologies. In an example, the fixed interpolation filter is pre-defined and does not depend on neighboring reconstructed samples of the current block. In an example, the current block is a luma block. In an example, the current block is a chroma block. The current block can be predicted using the MRL intra prediction where a reference line (e.g., the reference line 1 in FIG. 9) other than the reference line 0 is used to predict samples in the current block.

In the disclosure, the term "block" may be interpreted as a prediction block, a coding block, a coding unit (CU), or the like. The term "current block" may be interpreted as a prediction block that is being coded (e.g., under reconstruction), a coding block that is being coded (e.g., under reconstruction), a coding unit (CU) that is being coded (e.g., under reconstruction), or the like. The methods described in the disclosure may be applicable to multiple different video coding standards, including, but not limited to AV1, AOMedia Video Model (AVM), AOMedia Video 2 (AV2), Versatile Video Coding (VVC), Enhanced Compression Model (ECM), H.267, and/or the like.

The intra interpolation filter used in a directional (or an angular intra prediction mode) intra prediction mode can be derived or selected by neighboring reconstruction samples of the current block. For example, the current block in a picture is coded with the angular intra prediction mode using the intra interpolation filter. The intra interpolation filter used in the angular intra prediction mode can be determined (e.g., derived or selected) from the predefined set of intra interpolation filters based on the neighboring samples of the current block. The neighboring samples can include the neighboring reconstructed samples, for example, within N lines (e.g., N adjacent lines, N>1) from one or more boundaries of the current block. The determined intra interpolation filter (e.g., the selected or derived intra interpolation filter) can be applied to reference samples in a reference line in the picture to predict a sample in the current block using the angular intra prediction mode.

In an aspect, a value of N depends on a block size. N indicates a number of lines and/or a number of columns in the multiple reference lines. In one example, how many lines and/or columns are used depends on the block size. Whether using the neighboring reconstructed samples to derive the interpolation filter (e.g., the intra interpolation filter) can depend on a block area. For example, when the block area is smaller than a threshold, the neighboring pixels (e.g., the neighboring reconstructed samples) are used to derive the cost (e.g., a prediction error) of each filter (e.g., each intra interpolation filter in the predefined set of intra interpolation filters) to save (e.g., reduce) the signaling overhead.

Figure 11:
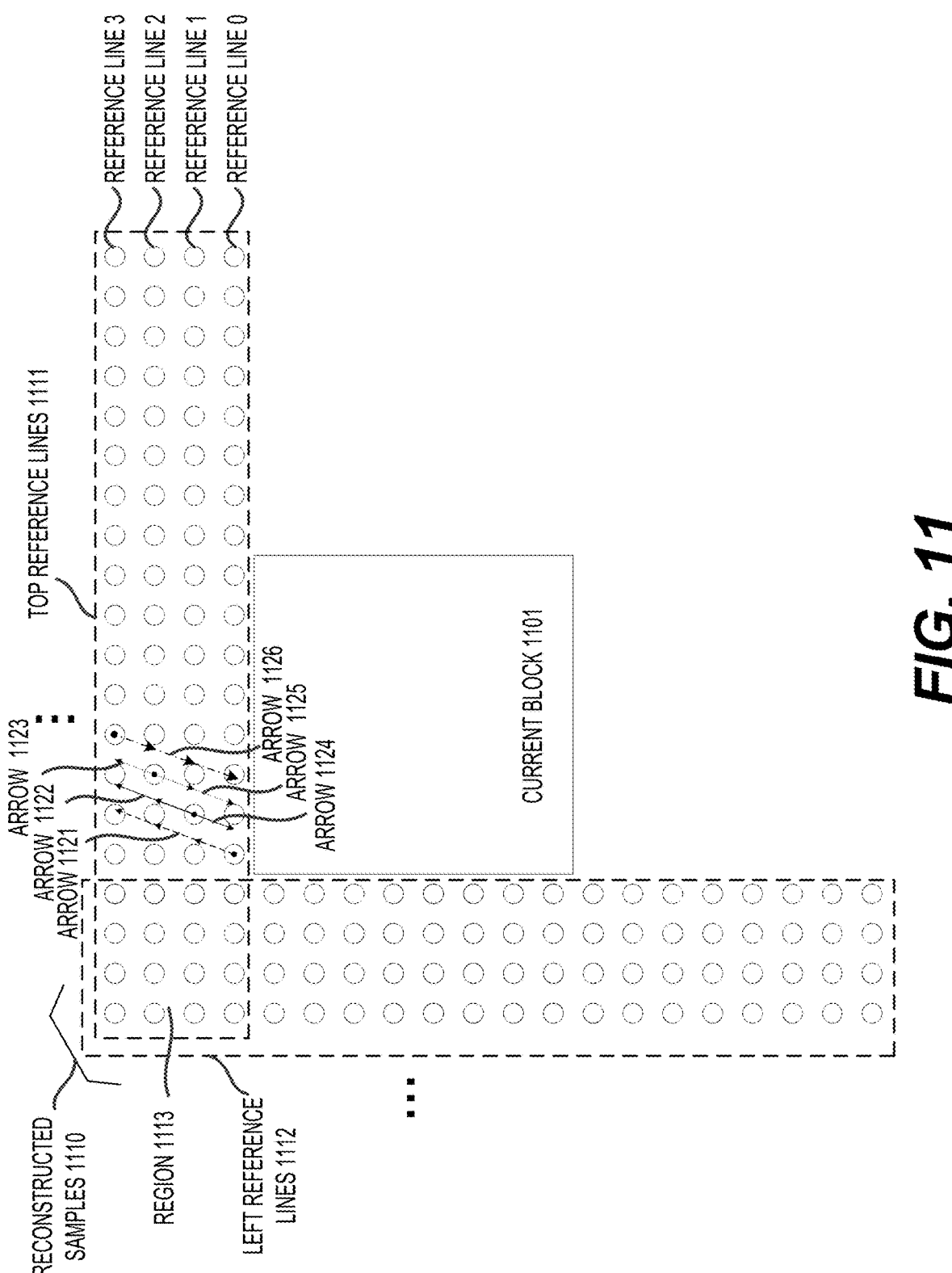
FIG. 11 shows an example of a current block that is coded using an angular intra prediction mode and neighboring reconstructed samples of the current block according to an aspect of the disclosure.

FIG. 11 shows an example of a current block (1101) that is coded using an angular intra prediction mode and neighboring reconstructed samples (1110) of the current block (1101) according to an aspect of the disclosure. In an example, the current block (1101) is under reconstruction. A prediction direction of the angular intra prediction mode can be referred to as an intra prediction direction. In the example shown in FIG. 11, arrows (1121)-(1123) indicate a same direction, e.g., the prediction direction of the angular intra prediction mode. Arrows (1124)-(1126) can indicate a same direction, e.g., an opposite direction to the prediction direction of the angular intra prediction mode. The opposite direction (e.g., pointing downward and being indicated by the arrows (1124)-(1126)) can be directly opposite to the prediction direction of the angular intra prediction mode (e.g., pointing upward and being indicated by the arrows (1121)-(1123)).

The neighboring reconstructed samples (1110) of the current block (1101) can be referred to as neighboring reconstruction samples of the current block (1101). The neighboring reconstructed samples (1110) of the current block (1101) can include samples in multiple reference lines (e.g., two or more reference lines). In the example shown in FIG. 11, the neighboring reconstructed samples (1110) of the current block (1101) include neighboring reconstructed samples in reference lines 0 to (N−1) where N is 4. The methods described with reference to FIG. 11 can be applied for any suitable N that is larger than 1. The reference line i can include reference samples that are i lines away from the current block (1101), for example, i lines away from boundaries (e.g., i rows away from a top boundary and/or i columns away from a left boundary) of the current block (1101) where i is 0, 1, 2, or 3 as shown in FIG. 11. For example, the reference line i includes reference samples that are i rows above the top boundary of the current block (1101) and/or i columns to the left of the left boundary of the current block (1101). In an example, the reference line 0 includes reference samples that are adjacent to the current block (1101), such as reconstructed neighboring samples including top neighboring samples that are above the current block (1101) and left neighboring samples that are to the left of the block (1101).

In an example, the neighboring reconstructed samples (1110) of the current block (1101) include top reference lines (1111) that are reference lines above the top boundary of the current block (1101). In an example, the neighboring reconstructed samples (1110) of the current block (1101) include left reference lines (1112) that are reference lines to the left the left boundary of the current block (1101). In an example, the neighboring reconstructed samples (1110) of the current block (1101) include the top reference lines (1111) and the left reference lines (1112).

In an aspect, N is larger than 1, and the angular intra prediction mode is already determined (e.g., associated with the prediction direction indicated by the arrows (1121)-

(1123)). The neighboring reconstructed samples can include multiple lines of neighboring reconstructed samples (e.g., the reference lines 0-3 in FIG. 11).

Each intra interpolation filter in the predefined set of intra interpolation filters can be applied to each line of neighboring reconstructed samples in the multiple lines of neighboring reconstructed samples to predict the respective line of neighboring reconstructed samples using the angular intra prediction mode, and respective prediction error(s) can be obtained. In an example, for each combination of an intra interpolation filter in the predefined set of intra interpolation filters and a line of neighboring reconstructed samples in the multiple lines of neighboring reconstructed samples, the respective line of neighboring reconstructed samples can be predicted and at least one prediction error can be obtained based on one or more remaining lines in the multiple lines of neighboring reconstructed samples using the respective intra interpolation filter and the angular intra prediction mode.

In an example, referring to FIG. 11, N is 4, the multiple lines of neighboring reconstructed samples include the reference lines 0-3, one of the predefined set of intra interpolation filters is a bilinear filter, the line of neighboring reconstructed samples in the multiple lines of neighboring reconstructed samples is the reference line 0. The one or more remaining lines in the multiple lines of neighboring reconstructed samples include the reference lines 1-3. The line of neighboring reconstructed samples (e.g., the reference line 0) can be predicted based on the reference lines 1-3, and the at least one prediction error include 3 prediction errors associated with the reference lines 1-3, respectively. For example, a first prediction error is based on the reconstructed samples in the reference line 0 and prediction samples of the reference line 0 based on the reference line 1 and the angular intra prediction mode associated with the prediction direction indicated by the arrow (1121). Similarly, the reference lines 1-3 can be predicted and corresponding prediction errors are obtained for the bilinear filter. For example, the reference line 1 is predicted based on the reference lines 0, 2, and 3, respectively, the bilinear filter, and the angular intra prediction mode associated with the prediction directions indicated by the arrows (1122) and (1124), and 3 prediction errors are obtained.

The above process for the one of the predefined set of intra interpolation filters (e.g., the bilinear filter) can be performed or repeated for other intra interpolation filters (e.g., the spline filter, the cubic filter, and/or the like) in the predefined set of intra interpolation filters. The intra interpolation filter that corresponds to the minimal prediction error among the obtained prediction errors can be selected. For example, if the minimal prediction error is a prediction error obtained using a specific intra interpolation filter (e.g., the bilinear filter), the specific intra interpolation filter is selected as the intra interpolation filter to be applied to the current block (1101) for the angular intra prediction mode (e.g., associated with the prediction direction indicated by the arrows (1121)-(1123)).

In one aspect, given the angular intra prediction mode (also referred to as the directional intra prediction mode) and multiple lines of neighboring reconstruction samples (e.g., the neighboring reconstruction samples in the reference lines 0-3 in FIG. 11), the predefined set of intra interpolation filters are applied to the reference lines (e.g., the reference lines 0-3 in FIG. 11) to predict each other along the intra prediction direction (e.g., the prediction direction that points upward and is indicated by the arrows (1121)-(1123)) and/or the opposite direction (e.g., the opposite direction that points downward and is indicated by the arrows (1124)-(1126)) and the intra interpolation filter candidate (also referred to as the candidate interpolation filter) with a minimal prediction error is selected as the intra interpolation filter of the current block (1101). Referring to FIG. 11, the reference line 0 is predicted by (indicated by the arrows (1121)) other reference lines such as the reference lines 1, 2, 3, . . . and (N−1). The reference line 1 can be predicted by (indicated by the arrows (1122) and (1124)) other reference lines such as the reference line 0, 2, 3, . . . , and (N−1). The reference line 2 can be predicted by (indicated by the arrows (1123) and (1125)) other reference lines such as the reference line 0, 1, 3, . . . , and (N−1). The reference line 3 can be predicted by (indicated by the arrows (1126)) other reference lines such as the reference line 0, 1, 2, . . . , and (N−1). Each of the candidate interpolation filter is applied for predicting the reference lines among each other, such as described above, and the one with the minimal prediction error is used as the prediction filter (e.g., the determined intra interpolation filter).

In an aspect, one of (i) a type of the intra interpolation filter or (ii) a number of taps in the intra interpolation filter is selected from the predefined set of intra interpolation filters based on the neighboring reconstructed samples of the current block.

In an example, the predefined set of intra interpolation filters includes different types of intra interpolation filters, such as one or more of a bilinear interpolation filter, a cubic interpolation filter, a spline interpolation filter, a DCT based interpolation filter, or a DST based interpolation filter. The type of the intra interpolation filter can be selected from the different types of intra interpolation filters based on the neighboring reconstructed samples of the current block. The selected intra interpolation filter can be one of a bilinear interpolation filter, a cubic interpolation filter, a spline interpolation filter, a DCT based interpolation filter, or a DST based interpolation filter.

For example, the predefined set of intra interpolation filters (e.g., the candidate intra interpolation filters) may include, but are not limited to a bilinear filter, a cubic filter, a spline interpolation filter, a DCT/DST based interpolation filter (e.g., a DCT or DST based interpolation filter).

In an example, the predefined set of intra interpolation filters includes different numbers of taps, such as one or more of a 2-tap interpolation filter, a 4-tap interpolation filter, a 6-tap interpolation filter, or an 8-tap interpolation filter. The number of taps of the intra interpolation filter can be selected based on the neighboring reconstructed samples of the current block. The number of taps of the intra interpolation filter can be one of 2-tap, 4-tap, 6-tap, or 8-tap.

In an example, the predefined set of intra interpolation filters (e.g., the candidate intra interpolation filters) may have different numbers of filter taps. For example, the candidate intra interpolation filters may be a group of 2-tap, 4-tap, 6-tap and 8-tap filters.

In an example, whether the multiple lines (e.g., the reference lines 0 to (N−1)) of neighboring reconstructed samples include (i) the left reference lines (1112) (e.g., left lines of neighboring reconstructed samples to the left of the current block (1101)), (ii) the top reference lines (1111) (e.g., top lines of neighboring reconstructed samples above the current block (1101)), or (iii) the left reference lines (1112) (e.g., the left lines of neighboring reconstructed samples to the left of the current block (1101)) and the top reference lines (1111) (e.g., the top lines of neighboring reconstructed samples above the current block (1101)) depends on the intra prediction direction of the angular intra prediction mode. In the example shown in FIG. 11, the intra prediction direction of the angular intra prediction mode points upward and is indicated by the arrows (1121)-(1123). For example, whether the left reference lines (e.g., the left reference lines (1112)), the above reference lines (also referred to as the top reference lines such as the top reference lines (1111)), or both the left and above reference lines are used for deriving the intra interpolation filter can depend on the given intra prediction direction such as indicated by the arrows (1121)-(1123) in FIG. 11. In an example, if the prediction direction is horizontal, the left reference lines are used. In an example, if the prediction direction is vertical, the top reference lines are used.

In an aspect, only the intra prediction direction is used to derive the selectable filters. For example, each line of neighboring reconstructed samples (e.g., the reference line 0) in the multiple lines is predicted based on the intra prediction direction of the angular intra prediction mode, such as the prediction direction indicated by the arrows (1121)-(1123). Referring to FIG. 11, in this case, the reference line 0 can be predicted based on the prediction direction indicated by the arrows (1121) from the reference lines 1-3, respectively; the reference line 1 can be predicted based on the prediction direction indicated by the arrows (1122) from the reference lines 2-3, respectively; the reference line 2 can be predicted based on the prediction direction indicated by the arrow (1123) from the reference line 3; and no prediction is performed to the reference line 3.

In an aspect, only the opposite direction to the intra prediction direction is used to derive the selectable filters. For example, each line of neighboring reconstructed samples (e.g., the reference line 1) in the multiple lines is predicted based on the opposite direction to the intra prediction direction of the angular intra prediction mode, such as the opposite direction indicated by the arrows (1124)-(1126). Referring to FIG. 11, in this case, the reference line 1 can be predicted based on the opposite direction indicated by the arrow (1124) from the reference line 0; the reference line 2 can be predicted based on the opposite direction indicated by the arrows (1125) from the reference lines 0-1. The reference line 3 can be predicted based on the opposite direction indicated by the arrows (1126) from the reference lines 0-2, respectively; and no prediction is performed on the reference line 0.

According to an aspect of the disclosure, the selection of the intra interpolation filter from the predefined set of intra interpolation filters and the selection of the angular intra prediction mode from angular intra prediction modes (e.g., a predefined set of angular intra prediction modes) can be performed based on the neighboring reconstructed samples of the current block (1101). Both the intra interpolation filter and the angular intra prediction mode can be selected based on the neighboring reconstructed samples of the current block (1101).

In an example, both the directional intra prediction mode (or the angular intra prediction mode) and the intra interpolation filter selections can be evaluated by a cost value calculated as the prediction error of prediction reference lines among each other, and the best L combinations of intra mode (e.g., one or more intra modes from the predefined set of angular intra prediction modes) and filter (e.g., one or more filters from the predefined set of intra prediction filters) are selected as the candidates. The actual angular intra prediction mode (e.g., associated with an intra prediction angle) and the interpolation filter (e.g., the intra interpolation filter) used in the intra prediction process can be obtained from the best L combinations of intra mode and filter.

In an example, the selection of the intra interpolation filter and the angular intra prediction mode includes the following. N1 angular intra prediction modes in the angular intra prediction modes (e.g., the predefined set of angular intra prediction modes) can be derived where the N1 angular intra prediction modes are associated with N1 lowest cost values in cost values of the respective angular intra prediction modes. Each cost value (e.g., a cost value of the respective angular intra prediction mode) can be determined based on the neighboring reconstructed samples of the current block (1101), the respective angular intra prediction mode, and a default intra interpolation filter (e.g., a filter in the predefined set of intra interpolation filters). For each of the N1 angular intra prediction modes, M1 intra interpolation filters from the predefined set of intra interpolation filters associated with M1 lowest cost values in cost values of the predefined set of intra interpolation filters can be selected. Each cost value (e.g., a cost value of a respective filter in the predefined set of intra interpolation filters) can be determined based on the neighboring reconstructed samples of the current block, the respective intra interpolation filter, and the respective angular intra prediction mode in the N1 angular intra prediction modes. The intra interpolation filter and the angular intra prediction mode can be selected from N1×M1 combinations where each combination in the N1×M1 combinations can include an intra interpolation filter in the M1 intra interpolation filters and an angular intra prediction mode in the N1 angular intra prediction modes.

For example, the default intra interpolation filter (which may be pre-defined) is applied to derive the best N1 intra prediction modes (e.g., the N1 angular intra prediction modes described above) using the neighboring reconstructed samples. After the best N1 intra prediction modes are selected, then the best M1 interpolation filters can be further selected, for example, from the predefined set of intra interpolation filters. Example values of M1 and N1 can include, but are not limited to 1, 2, 3, 4, or the like. M1 and N1 can be positive integers.

In one aspect, the intra prediction mode (e.g., the angular intra prediction mode) and the intra interpolation filter can be decided by the neighboring reconstruction samples in an iterative way. That is, the intra prediction filter can be first selected using the method described above, for example, the intra prediction filter is selected as one of the M1 intra interpolation filters. Then the best L1 intra prediction modes are further selected by trying each intra prediction mode in the neighboring reconstructed samples and selecting the L1 intra prediction modes associated with the least L1 prediction errors with the intra prediction filter. Subsequently, the intra interpolation filter can be further refined using a similar approach. With the refined intra interpolation filter, the intra prediction modes can be further refined.

In an example, the iterative search of the intra prediction mode (e.g., the angular intra prediction mode) and the intra interpolation filter can be terminated when the prediction error is no longer reduced, the prediction error is within a pre-defined threshold (e.g., a first pre-defined threshold), or the reduction of the prediction error during the search process is within a pre-defined threshold (e.g., a second pre-defined threshold) (e.g., an error difference between consecutive iterations is within the second pre-defined threshold).

An example of the last two iterations (e.g., a first iteration and a second iteration) in the iterative process is described below. In the first iteration, N2 angular intra prediction modes can be selected from a first plurality of modes in the angular intra prediction modes based on the neighboring reconstructed samples of the current block and an intra interpolation filter. A first updated intra interpolation filter can be selected based on the neighboring reconstructed samples of the current block and one of the N2 directional intra prediction modes, such as described in FIG. 11. In the second iteration, N3 angular intra prediction modes can be selected from a second plurality of modes in the angular intra prediction modes based on the neighboring reconstructed samples of the current block and the first updated intra interpolation filter. A second updated intra interpolation filter can be selected based on the neighboring reconstructed samples of the current block and one of the N3 angular intra prediction modes. The iteration process can be terminated and the intra interpolation filter and the angular intra prediction mode can be selected based on one of (i) a first prediction error of the first iteration and a second prediction error of the second iteration and (ii) the second prediction error of the second iteration. The first prediction error can be associated with the first updated intra interpolation filter and the one of the N2 directional intra prediction modes. The second prediction error can be associated with the second updated intra interpolation filter and the one of the N3 angular intra prediction modes. In an example, the second updated intra interpolation filter is selected as the selected intra interpolation filter and the one of the N3 angular intra prediction modes is selected as the selected angular intra prediction mode based on a difference between the first prediction error and the second prediction error, such as the absolute difference between the first prediction error and the second prediction error is within the second pre-defined threshold. In an example, the second updated intra interpolation filter is selected as the selected intra interpolation filter and the one of the N3 angular intra prediction modes is selected as the selected angular intra prediction mode based on the second prediction error, such as the second prediction error is within the first pre-defined threshold.

In an example, the first plurality of modes and the second plurality of modes are identical to the angular intra prediction modes. In an example, the first plurality of modes and the second plurality of modes are subsets of the angular intra prediction modes. The subsets of the angular intra prediction modes can be obtained from previous iterations. For example, the second plurality of modes are the N2 angular intra prediction modes.

In an aspect, the angular intra prediction mode and the intra interpolation filter can be decided based the neighboring reconstruction samples in another iterative way: an angular intra prediction mode is selected initially, then the best intra prediction filters may be obtained, followed by refining the angular intra prediction mode using a similar approach, for example, based on one of the best intra prediction filters. With the refined angular intra prediction mode, intra prediction filters can be further refined.

According to an aspect of the disclosure, for each combination of an angular intra prediction mode in the angular intra prediction modes and an intra interpolation filter from the predefined set of intra interpolation filters, a cost value for the respective combination is determined based on the neighboring reconstructed samples of the current block, for example, using methods described in FIG. 11. In an example, the cost value is determined based on the reconstructed samples in a reference line (e.g., the reference line 0) and predicted samples of the reference line (e.g., predicted by the reference line 1 with the angular intra prediction mode and intra interpolation filter in the combination), such as shown in FIG. 11. In an example, cost values are determined based on the reconstructed samples in the reference line (e.g., the reference line 0) and predicted samples of the reference line using the respective reference lines (e.g., predicted by the reference lines 1-3 with the angular intra prediction mode and intra interpolation filter in the combination), and the cost value is one (e.g., the least cost value) of the cost values, such as shown in FIG. 11. The K combinations can be selected based on the determined cost values. The intra interpolation filter and the angular intra prediction mode can be selected from the K combinations based on index information signaled in the bitstream. In an example, the combinations of the angular intra prediction mode and the intra interpolation filters are ranked, for example, in an ascending order of the cost values, and the K combinations are associated with K smallest cost values in the cost values.

In one example, the selection of the directional intra prediction mode and the intra interpolation filter by using the neighboring reconstructed samples can be performed at both the encoder and decoder sides. The combinations of intra prediction modes (e.g., angular intra prediction modes) and intra interpolation filters can be selected. In one example, the order for the combinations of the directional intra prediction modes and intra interpolation filters is determined based on the calculated cost value of each combination. FIG. 11 shows an example of calculating cost value of each combination. A syntax element can be signaled in the bitstream, for example, to indicate which combination is to be used for the current block. In an example, the combinations of the intra prediction modes (e.g., angular intra prediction modes) and the intra interpolation filters can be ranked, for example, based on the calculated cost values of the combinations.

According to an aspect of the disclosure, a feature value can be calculated based on the neighboring reconstructed samples of the current block, and the intra interpolation filter can be selected from the predefined set of intra interpolation filters based on the calculated feature value. The feature value can be calculated as an absolute gradient value associated with the neighboring reconstructed samples of the current block or a difference between a minimal value of the neighboring reconstructed samples of the current block and a maximal value of the neighboring reconstructed samples of the current block. For example, given the neighboring reconstruction samples, a feature value is calculated, such as an absolute gradient value and a difference between minimal and max values (e.g., the difference between the minimal value and the maximal value). Subsequently, based on the feature value, an intra interpolation filter (e.g., the intra interpolation filter to be used in the angular intra prediction mode to predict the current block) can be selected from a group of predefined intra interpolation filters (e.g., the predefined set of intra interpolation filters). In an example, the intra interpolation filter with the maximum gradient value or the minimum gradient value is selected. In an example, absolute gradient value(s) are calculated based on one or more predefined directions.

According to an aspect of the disclosure, an output can be obtained from a neural network (e.g., a convolutional neural network (CNN)). An input of the neural network can include the neighboring reconstructed samples of the current block, and the output (e.g., an index) indicates the selected intra interpolation filter that is one of the predefined set of intra interpolation filters. In an example, the input of the neural network further includes an intra prediction mode index indicating the angular intra prediction mode.

In an example, the neighboring reconstruction samples are fed into a convolutional neural network (CNN), and the output includes an index of the selected intra interpolation filter from a group of pre-defined intra interpolation filters (e.g., the predefined set of intra interpolation filters). The network parameters (e.g., the parameters of the CNN) can be pretrained and evaluated both at the encoder side and the decoder side, or trained online using reconstructed blocks. In one example, the intra prediction mode index, together with the neighboring reconstruction samples, are fed into a CNN to derive the intra interpolation filter.

The descriptions of (i) the determination (e.g., selection) of the intra interpolation filter or (ii) the determination (e.g., selection) of the intra interpolation filter and the angular intra prediction mode for the current block (1101) can be based on any suitable neighboring reconstructed samples of the current block (1101). A size of the neighboring reconstructed samples of the current block (1101) can depend on (e.g., increase with) the block size of the current block (1101). Referring to FIG. 11, the top reference lines (1111) and the left reference lines (1112) can include a region (1113) that is a top-left neighbor of the current block (1101). In some examples, the top reference lines (1111) and/or the left reference lines (1112) may include a portion of the region (1113). In some examples, the top reference lines (1111) and/or the left reference lines (1112) may not include the region (1113).

Figure 12:
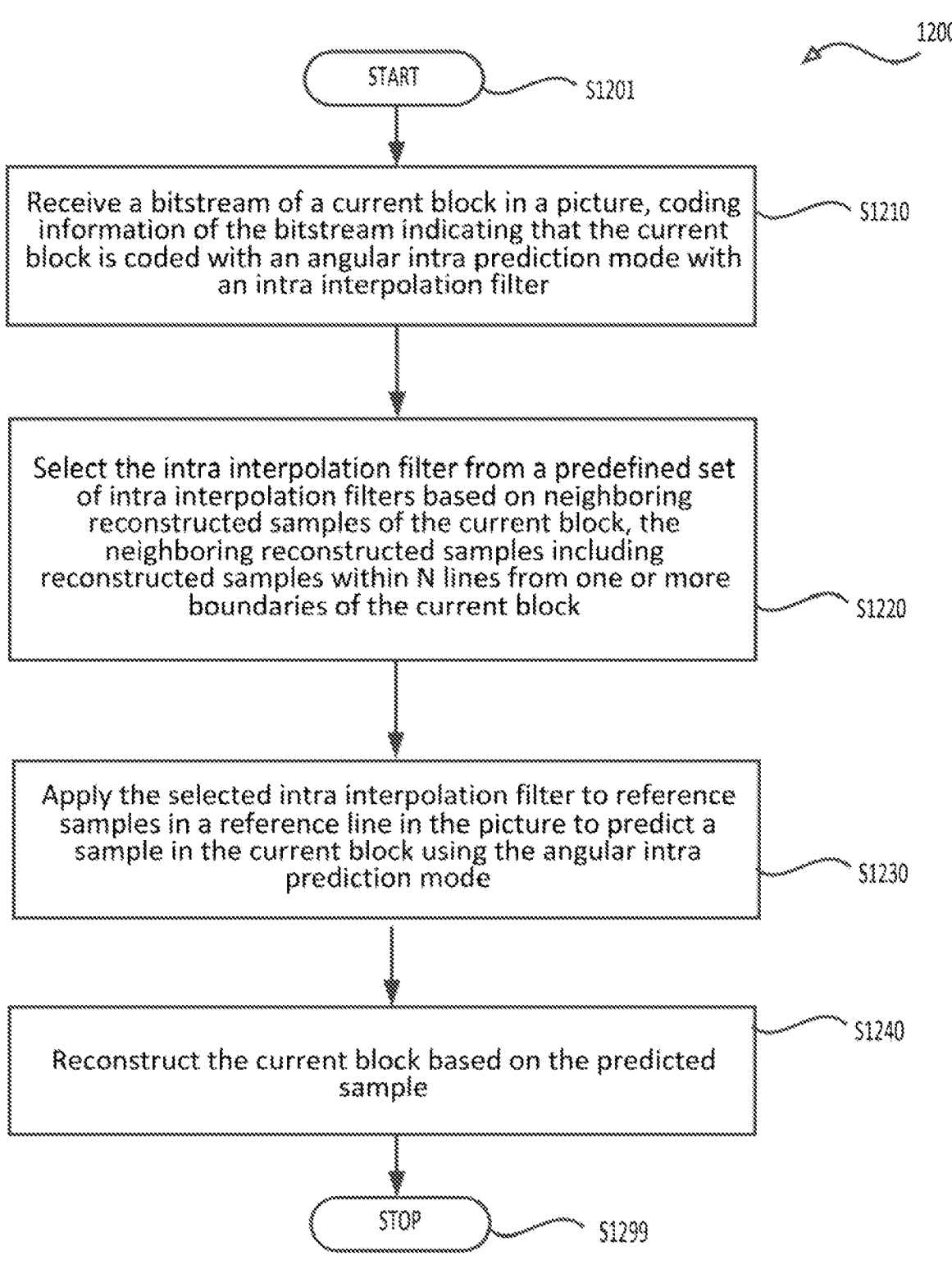
FIG. 12 shows a flow chart outlining a decoding process according to some aspects of the disclosure.

FIG. 12 shows a flow chart outlining a process (1200) according to an aspect of the disclosure. The process (1200) can be used in a video decoder. In various aspects, the process (1200) is executed by processing circuitry, such as the processing circuitry that performs functions of the video decoder (110), the processing circuitry that performs functions of the video decoder (210), and the like. In some aspects, the process (1200) is implemented in software instructions, thus when the processing circuitry executes the software instructions, the processing circuitry performs the process (1200). The process (1200) starts at (S1201) and proceeds to (S1210).

At (S1210), a bitstream of a current block in a picture is received. Coding information of the bitstream can indicate that the current block is coded with an angular intra prediction mode with an intra interpolation filter.

At (S1220), the intra interpolation filter can be determined (e.g., selected) from a predefined set of intra interpolation filters based on neighboring reconstructed samples of the current block. The neighboring reconstructed samples can include reconstructed samples within N lines from one or more boundaries of the current block, such as shown in FIG. 11.

In an aspect, one of (i) a type of the intra interpolation filter or (ii) a number of taps in the intra interpolation filter is selected from the predefined set of intra interpolation filters based on the neighboring reconstructed samples of the current block.

In an example, the predefined set of intra interpolation filters includes different types of intra interpolation filters. The type of the intra interpolation filter can be selected from the different types of intra interpolation filters based on the neighboring reconstructed samples of the current block. The selected intra interpolation filter can be one of a bilinear interpolation filter, a cubic interpolation filter, a spline interpolation filter, a DCT based interpolation filter, or a DST based interpolation filter.

In an example, the predefined set of intra interpolation filters includes different numbers of taps. The number of taps of the intra interpolation filter can be selected based on the neighboring reconstructed samples of the current block. The number of taps of the intra interpolation filter can be 2-tap, 4-tap, 6-tap, or 8-tap.

In an example, whether the neighboring reconstructed samples include (i) left lines of neighboring reconstructed samples to the left of the current block, (ii) top lines of neighboring reconstructed samples above the current block, or (iii) the left lines of neighboring reconstructed samples to the left of the current block and the top lines of neighboring reconstructed samples above the current block depends on an intra prediction direction of the angular intra prediction mode.

In an example, a value of N depends on a block size.

In an aspect, N is larger than 1 and the neighboring reconstructed samples include multiple lines of neighboring reconstructed samples. For each combination of an intra interpolation filter in the predefined set of intra interpolation filters and a line of neighboring samples in the multiple lines of neighboring reconstructed samples, the respective line of neighboring reconstructed samples can be predicted and at least one prediction error can be obtained based on one or more remaining lines in the multiple lines of neighboring reconstructed samples using the respective intra interpolation filter. The intra interpolation filter that corresponds to the minimal prediction error among the obtained prediction errors can be selected.

In an example, each line of neighboring reconstructed samples is predicted based on an intra prediction direction of the angular intra prediction mode. In an example, each line of neighboring reconstructed samples is predicted based on an opposite direction to the intra prediction direction of the angular intra prediction mode.

In an aspect, (i) the intra interpolation filter is selected from the predefined set of intra interpolation filters and (ii) the angular intra prediction mode is selected from angular intra prediction modes based on the neighboring reconstructed samples of the current block.

In an example, N1 angular intra prediction modes in the angular intra prediction modes associated with N1 lowest cost values in cost values of the respective angular intra prediction modes are derived. Each cost value can be determined based on the neighboring reconstructed samples of the current block, the respective angular intra prediction mode, and a default intra interpolation filter in the predefined set of intra interpolation filters. For each of the N1 angular intra prediction modes, M1 intra interpolation filters can be selected from the predefined set of intra interpolation filters associated with M1 lowest cost values in cost values of the predefined set of intra interpolation filters. Each cost value can be determined based on the neighboring reconstructed samples of the current block, the respective intra interpolation filter, and the respective angular intra prediction mode in the N1 angular intra prediction modes. The intra interpolation filter and the angular intra prediction mode can be selected from N1×M1 combinations. Each combination in the N1×M1 combinations can include an intra interpolation filter in the M1 intra interpolation filters and an angular intra prediction mode in the N1 angular intra prediction modes.

In an example, the selection of the angular intra prediction mode and the intra interpolation filter is performed iteratively in an iterative process. The iterative process can include: selecting N2 angular intra prediction modes from a first plurality of modes in the angular intra prediction modes based on the neighboring reconstructed samples of the current block and an intra interpolation filter; selecting a first updated intra interpolation filter based on the neighboring reconstructed samples of the current block and one of the N2 directional intra prediction modes; selecting N3 angular intra prediction modes from a second plurality of modes the angular intra prediction modes based on the neighboring reconstructed samples of the current block and the first updated intra interpolation filter; selecting a second updated intra interpolation filter based on the neighboring reconstructed samples of the current block and one of the N3 angular intra prediction modes; and selecting the second updated intra interpolation filter as the selected intra interpolation filter and selecting the one of the N3 angular intra prediction modes as the selected angular intra prediction mode based on (i) a difference between a first prediction error associated with the first updated intra interpolation filter and the one of the N2 directional intra prediction modes and a second prediction error associated with the second updated intra interpolation filter and the one of the N3 angular intra prediction modes or (ii) the second prediction error. In an example, the first plurality of modes and the second plurality of modes are identical to the angular intra prediction modes. In an example, the first plurality of modes and the second plurality of modes are subsets of the angular intra prediction modes. The subsets of the angular intra prediction modes can be obtained from previous iterations. For example, the second plurality of modes are the N2 angular intra prediction modes.

In an example, for each combination of an angular intra prediction mode in the angular intra prediction modes and an intra interpolation filter from the predefined set of intra interpolation filters, a cost value for the respective combination is determined based on the neighboring reconstructed samples of the current block. K combinations can be selected based on the determined cost values. The intra interpolation filter and the angular intra prediction mode can be selected from the K combinations based on index information signaled in the bitstream.

In an aspect, a feature value is calculated based on the neighboring reconstructed samples of the current block, and the intra interpolation filter can be selected based on the calculated feature value.

In an aspect, a neural network (such as a CNN) can be used to determine the intra interpolation filter for the current block. An input of the neural network includes the neighboring reconstructed samples of the current block, and an output is obtained from the neural network based on the input. The output can indicate the selected intra interpolation filter. In an example, the input of the neural network further includes an intra prediction mode index indicating the angular intra prediction mode.

At (S1230), the selected intra interpolation filter can be applied to reference samples in a reference line in the picture to predict a sample in the current block using the angular intra prediction mode, such as shown in FIG. 10.

At (S1240), the current block can be reconstructed based on the predicted sample.

Then, the process proceeds to (S1299) and terminates.

Figure 14:
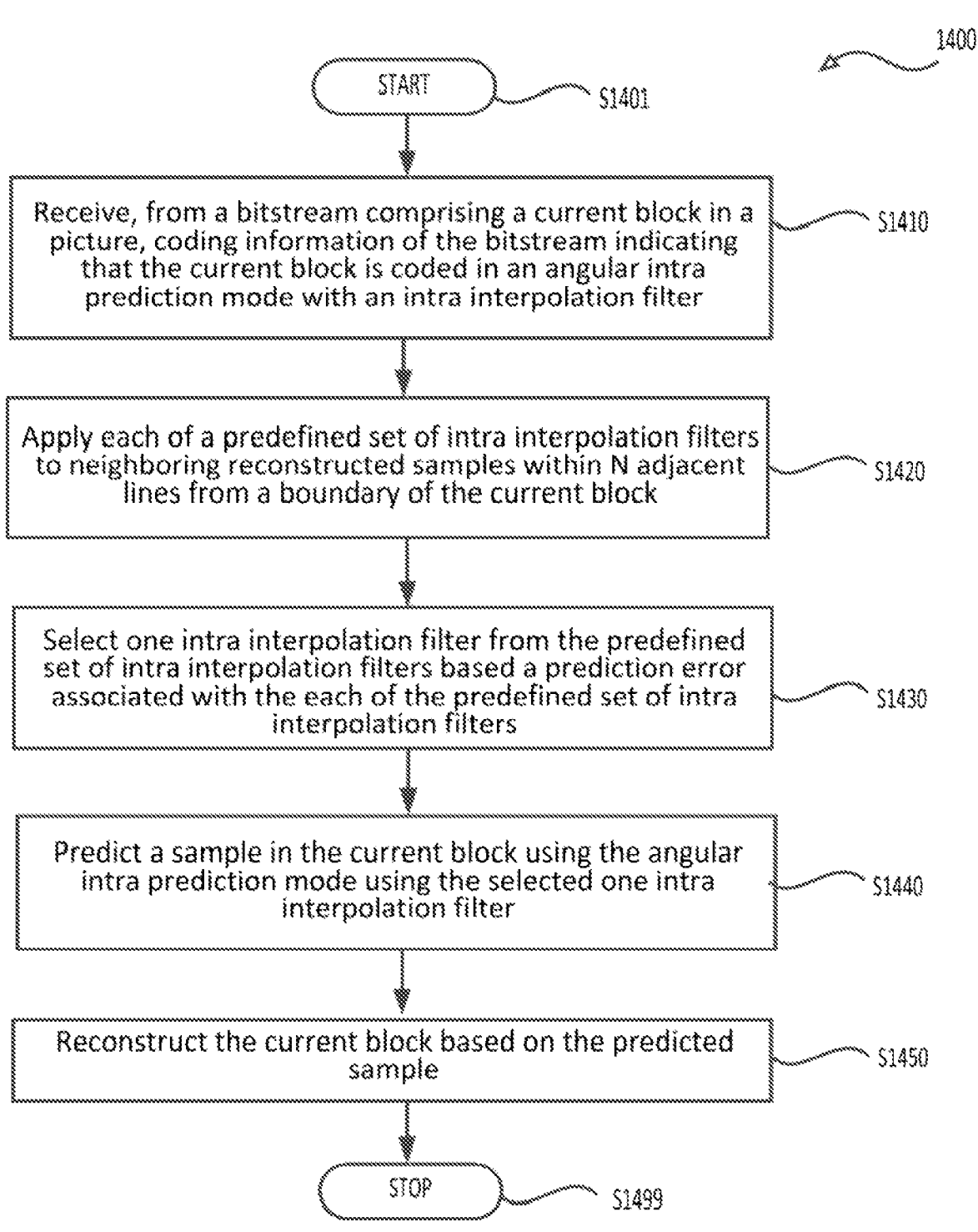
FIG. 14 shows a flow chart outlining a decoding process according to some aspects of the disclosure.

The process (1200) can be suitably adapted. Step(s) in the process (1200) can be modified and/or omitted. Additional step(s) can be added. Any suitable order of implementation can be used. FIG. 14 shows a variation to the process (1200).

FIG. 13 shows a flow chart outlining a process (1300) according to an aspect of the disclosure. The process (1300) can be used in a video encoder. In various aspects, the process (1300) is executed by processing circuitry, such as the processing circuitry that performs functions of the video encoder (103), the processing circuitry that performs functions of the video encoder (303), and the like. In some aspects, the process (1300) is implemented in software instructions, thus when the processing circuitry executes the software instructions, the processing circuitry performs the process (1300). The process starts at (S1301) and proceeds to (S1310).

At (S1310), an intra interpolation filter can be selected from a predefined set of intra interpolation filters based on neighboring reconstructed samples of a current block. The neighboring reconstructed samples can include reconstructed samples within N lines from one or more boundaries of the current block. The current block is coded with an angular intra prediction mode with the selected intra interpolation filter.

At (S1320), the selected intra interpolation filter can be applied to reference samples in a reference line in the picture to predict a sample in the current block using the angular intra prediction mode.

At (S1330), the current block is encoded based on the predicted sample.

Then, the process proceeds to (S1399) and terminates.

The process (1300) can be suitably adapted. Step(s) in the process (1300) can be modified and/or omitted. Additional step(s) can be added. Any suitable order of implementation can be used.

FIG. 14 shows a flow chart outlining a process (1400) according to an aspect of the disclosure. The process (1400) can be used in a video decoder. In various aspects, the process (1400) is executed by processing circuitry, such as the processing circuitry that performs functions of the video decoder (110), the processing circuitry that performs functions of the video decoder (210), and the like. In some aspects, the process (1400) is implemented in software instructions, thus when the processing circuitry executes the software instructions, the processing circuitry performs the process (1400). The process (1400) starts at (S1401) and proceeds to (S1410).

At (S1410), coding information of a bitstream indicating that a current block is coded in an angular intra prediction mode with an intra interpolation filter is received from the bitstream comprising the current block in a picture.

At (S1420), each of a predefined set of intra interpolation filters is applied to neighboring reconstructed samples within N adjacent lines from a boundary of the current block. N is a positive integer, such as described in FIG. 11.

At (S1430), one intra interpolation filter is selected from the predefined set of intra interpolation filters based a prediction error associated with the each of the predefined set of intra interpolation filters, such as described in FIGS. 11 and 12

At (S1440), a sample in the current block is predicted using the angular intra prediction mode using the selected one intra interpolation filter, such as described in FIG. 12.

At (S1450), the current block is reconstructed based on the predicted sample.

Then, the process proceeds to (S1499) and terminates.

The process (1400) can be suitably adapted. Step(s) in the process (1400) can be modified and/or omitted. Additional step(s) can be added. Any suitable order of implementation can be used.

Aspects and examples in the disclosure may be used separately or combined in any order. Further, each of the methods (or aspects, examples), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media.

Figure 15:
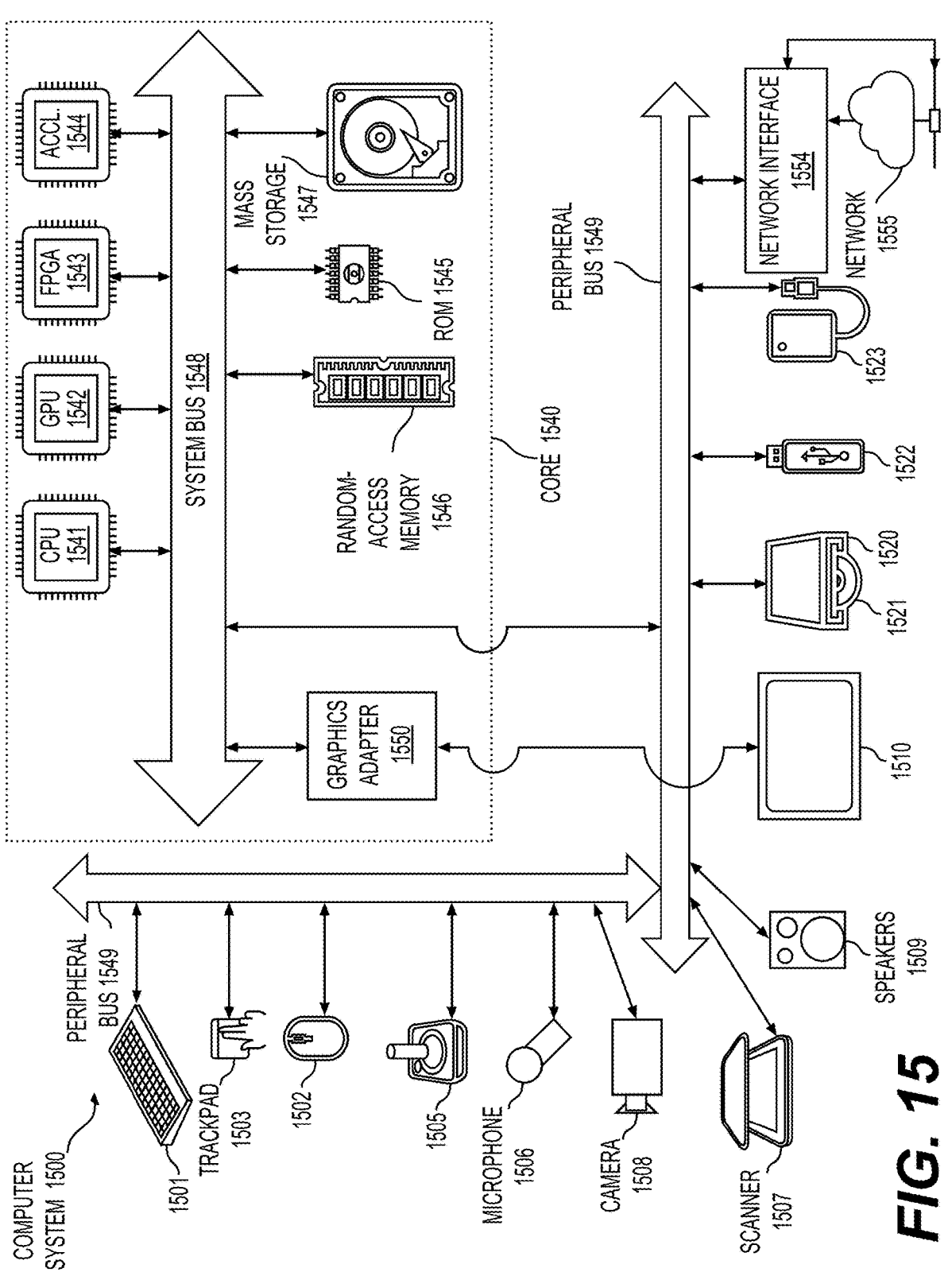
FIG. 15 is a schematic illustration of a computer system in accordance with an aspect.

For example, FIG. 15 shows a computer system (1500) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system (1500) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various aspects of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:

receiving, from a bitstream comprising a current block in a picture, coding information of the bitstream indicating that the current block is coded in an angular intra prediction mode;

for each combination of (i) an intra interpolation filter in a predefined set of intra interpolation filters and (ii) a line of neighboring reconstructed samples in multiple lines of neighboring reconstructed samples within N adjacent lines from a boundary of the current block, N being an integer larger than 1, predicting the respective line of neighboring reconstructed samples based on one or more remaining lines in the multiple lines of neighboring reconstructed samples using the respective intra interpolation filter and the angular intra prediction mode to obtain one or more predictions of the respective line; and obtaining one or more prediction errors based on (i) the one or more predictions of the respective line of neighboring reconstructed samples and (ii) the respective line of neighboring reconstructed samples, the one or more prediction errors being associated with the respective intra interpolation filter, each of the one or more prediction errors being associated with one of the one or more predictions of the respective line of neighboring reconstructed samples;

selecting one intra interpolation filter from the predefined set of intra interpolation filters based on the obtained prediction errors;

predicting a sample in the current block using the angular intra prediction mode and the selected one intra interpolation filter; and reconstructing the current block based on the predicted sample.

2. The method of claim 1, wherein the selecting the one intra interpolation filter comprises:

selecting one of (i) a type of the intra interpolation filter or (ii) a number of taps in the one intra interpolation filter from the predefined set of intra interpolation filters based on the neighboring reconstructed samples of the current block.

3. The method of claim 2, wherein the predefined set of intra interpolation filters includes different types of intra interpolation filters; and the selecting the one intra interpolation filter includes selecting the type of the one intra interpolation filter from the different types of intra interpolation filters based on the neighboring reconstructed samples of the current block, the selected one intra interpolation filter being one of a bilinear interpolation filter, a cubic interpolation filter, a spline interpolation filter, a DCT-based interpolation filter, or a DST-based interpolation filter.

4. The method of claim 2, wherein the predefined set of intra interpolation filters includes different numbers of taps; and the selecting the one intra interpolation filter includes selecting the number of taps of the one intra interpolation filter based on the neighboring reconstructed samples of the current block, the number of taps of the one intra interpolation filter being one of 2-tap, 4-tap, 6-tap, or 8-tap.

5. The method of claim 1, wherein whether the neighboring reconstructed samples include (i) left lines of neighboring reconstructed samples to the left of the current block, (ii) top lines of neighboring reconstructed samples above the current block, or (iii) the left lines of neighboring reconstructed samples to the left of the current block and the top lines of neighboring reconstructed samples above the current block depends on an intra prediction direction of the angular intra prediction mode.

6. The method of claim 1, wherein a value of N depends on a block size.

7. The method of claim 1, wherein for each combination of (i) the intra interpolation filter in the predefined set of intra interpolation filters and (ii) the line of neighboring reconstructed samples in the multiple lines of neighboring reconstructed samples, the predicting the respective line of neighboring reconstructed samples comprises predicting each line of neighboring reconstructed samples based on an intra prediction direction of the angular intra prediction mode.

8. The method of claim 1, wherein for each combination of (i) the intra interpolation filter in the predefined set of intra interpolation filters and (ii) the line of neighboring reconstructed samples in the multiple lines of neighboring reconstructed samples, the predicting the respective line of neighboring reconstructed samples comprises predicting each line of neighboring reconstructed samples based on an opposite direction to an intra prediction direction of the angular intra prediction mode.

9. The method of claim 1, wherein the selecting the one intra interpolation filter comprises:

for each intra interpolation filter in the predefined set of intra interpolation filters, determining a prediction error associated with the respective intra interpolation filter based on the one or more prediction errors associated with the respective intra interpolation filter; and selecting the one intra interpolation filter that corresponds to the minimum prediction error among the determined prediction errors associated with the predefined set of intra interpolation filters.

10. A method for video encoding, comprising:

for each combination of (i) an intra interpolation filter in a predefined set of intra interpolation filters and (ii) a line of neighboring reconstructed samples in multiple lines of neighboring reconstructed samples within N adjacent lines from a boundary of a current block in a picture, the current block being encoded in an angular intra prediction mode, N being an integer larger than 1, predicting the respective line of neighboring reconstructed samples based on one or more remaining lines in the multiple lines of neighboring reconstructed samples using the respective intra interpolation filter and the angular intra prediction mode to obtain one or more predictions of the respective line; and obtaining one or more prediction errors based on (i) the one or more predictions of the respective line of neighboring reconstructed samples and (ii) the respective line of neighboring reconstructed samples, the one or more prediction errors being associated with the respective intra interpolation filter, each of the one or more prediction errors being associated with one of the one or more predictions of the respective line of neighboring reconstructed samples;

selecting one intra interpolation filter from the predefined set of intra interpolation filters based on the obtained prediction errors;

predicting a sample in the current block using the angular intra prediction mode and the selected one intra interpolation filter;

encoding the current block based on the predicted sample; and encoding coding information in a bitstream indicating that the current block is coded in the angular intra prediction mode.

11. The method of claim 10, wherein the selecting the one intra interpolation filter comprises:

selecting one of (i) a type of the intra interpolation filter or (ii) a number of taps in the one intra interpolation filter from the predefined set of intra interpolation filters based on the neighboring reconstructed samples of the current block.

12. The method of claim 11, wherein the predefined set of intra interpolation filters includes different types of intra interpolation filters; and the selecting the one intra interpolation filter includes selecting the type of the one intra interpolation filter from the different types of intra interpolation filters based on the neighboring reconstructed samples of the current block, the selected one intra interpolation filter being one of a bilinear interpolation filter, a cubic interpolation filter, a spline interpolation filter, a DCT-based interpolation filter, or a DST-based interpolation filter.

13. The method of claim 11, wherein the predefined set of intra interpolation filters includes different numbers of taps; and the selecting the one intra interpolation filter includes selecting the number of taps of the one intra interpolation filter based on the neighboring reconstructed samples of the current block, the number of taps of the one intra interpolation filter being one of 2-tap, 4-tap, 6-tap, or 8-tap.

14. The method of claim 10, wherein whether the neighboring reconstructed samples include (i) left lines of neighboring reconstructed samples to the left of the current block, (ii) top lines of neighboring reconstructed samples above the current block, or (iii) the left lines of neighboring reconstructed samples to the left of the current block and the top lines of neighboring reconstructed samples above the current block depends on an intra prediction direction of the angular intra prediction mode.

15. The method of claim 10, wherein a value of N depends on a block size.

16. The method of claim 10, wherein for each combination of (i) the intra interpolation filter in the predefined set of intra interpolation filters and (ii) the line of neighboring reconstructed samples in the multiple lines of neighboring reconstructed samples, the predicting the respective line of neighboring reconstructed samples comprises predicting each line of neighboring reconstructed samples based on an intra prediction direction of the angular intra prediction mode.

17. The method of claim 10, wherein for each combination of (i) the intra interpolation filter in the predefined set of intra interpolation filters and (ii) the line of neighboring reconstructed samples in the multiple lines of neighboring reconstructed samples, the predicting the respective line of neighboring reconstructed samples comprises predicting each line of neighboring reconstructed samples based on an opposite direction to an intra prediction direction of the angular intra prediction mode.

18. The method of claim 10, wherein the selecting the one intra interpolation filter comprises:

for each intra interpolation filter in the predefined set of intra interpolation filters, determining a prediction error associated with the respective intra interpolation filter based on the one or more prediction errors associated with the respective intra interpolation filter; and selecting the one intra interpolation filter that corresponds to the minimum prediction error among the determined prediction errors associated with the predefined set of intra interpolation filters.

19. A non-transitory computer-readable storage medium storing instructions which when executed by a processor cause the processor to perform an encoding method comprising:

for each combination of (i) an intra interpolation filter in a predefined set of intra interpolation filters and (ii) a line of neighboring reconstructed samples in multiple lines of neighboring reconstructed samples within N adjacent lines from a boundary of a current block in a picture, the current block being encoded in an angular intra prediction mode, N being an integer larger than 1, predicting the respective line of neighboring reconstructed samples based on one or more remaining lines in the multiple lines of neighboring reconstructed samples using the respective intra interpolation filter and the angular intra prediction mode to obtain one or more predictions of the respective line; and obtaining one or more prediction errors based on (i) the one or more predictions of the respective line of neighboring reconstructed samples and (ii) the respective line of neighboring reconstructed samples, the one or more prediction errors being associated with the respective intra interpolation filter, each of the one or more prediction errors being associated with one of the one or more predictions of the respective line of neighboring reconstructed samples;

selecting one intra interpolation filter from the predefined set of intra interpolation filters based on the obtained prediction errors;

predicting a sample in the current block using the angular intra prediction mode and the selected one intra interpolation filter;

encoding the current block based on the predicted sample;

encoding coding information in a bitstream indicating that the current block is coded in the angular intra prediction mode; and transmitting the bitstream.

20. The non-transitory computer-readable storage medium of claim 19, wherein the selecting the one intra interpolation filter comprises:

for each intra interpolation filter in the predefined set of intra interpolation filters, determining a prediction error associated with the respective intra interpolation filter based on the one or more prediction errors associated with the respective intra interpolation filter; and selecting the one intra interpolation filter that corresponds to the minimum prediction error among the determined prediction errors associated with the predefined set of intra interpolation filters.

* * * * *